(12) United States Patent
Kondo

(10) Patent No.: US 12,206,901 B2
(45) Date of Patent: Jan. 21, 2025

(54) IMAGE PROCESSING DEVICE AND IMAGE PROCESSING METHOD

(71) Applicant: Sony Group Corporation, Tokyo (JP)

(72) Inventor: Kenji Kondo, Tokyo (JP)

(73) Assignee: Sony Group Corporation, Tokyo (JP)

( * ) Notice: Subject to any disclaimer, the term of this patent is extended or adjusted under 35 U.S.C. 154(b) by 154 days.

(21) Appl. No.: 17/774,863

(22) PCT Filed: Dec. 18, 2020

(86) PCT No.: PCT/JP2020/047392
§ 371 (c)(1),
(2) Date: May 6, 2022

(87) PCT Pub. No.: WO2021/125316
PCT Pub. Date: Jun. 24, 2021

(65) Prior Publication Data
US 2022/0385945 A1    Dec. 1, 2022

Related U.S. Application Data

(60) Provisional application No. 62/954,120, filed on Dec. 27, 2019, provisional application No. 62/951,896, filed on Dec. 20, 2019.

(51) Int. Cl.
*H04N 19/70* (2014.01)
(52) U.S. Cl.
CPC .................... *H04N 19/70* (2014.11)
(58) Field of Classification Search
CPC ..................................... H04N 19/70
(Continued)

(56) References Cited

U.S. PATENT DOCUMENTS

2020/0396467 A1* 12/2020 Lai ........................ H04N 19/103
2021/0176479 A1*  6/2021 Liao ..................... H04N 19/186
(Continued)

FOREIGN PATENT DOCUMENTS

EP    3104606 A1 * 12/2016   ........... H04N 19/102

OTHER PUBLICATIONS

International Search Report and Written Opinion mailed on Mar. 9, 2021, received for PCT Application PCT/JP2020/047392, Filed on Dec. 18, 2020, 16 pages including English Translation.
(Continued)

*Primary Examiner* — Albert Kir
(74) *Attorney, Agent, or Firm* — XSENSUS LLP

(57) ABSTRACT

The present disclosure relates to an image processing device and an image processing method that make it possible to avoid an increase in memory size.
An adaptive color conversion unit performs adaptive color conversion processing of adaptively performing conversion of a color space of an image to be encoded, on a residual signal of the image, and an orthogonal transform unit performs orthogonal transform processing for each of orthogonal transform blocks that are units of processing, on a residual signal of the image or on a residual signal of the image subjected to the adaptive color conversion processing. Then, control related to application of the adaptive color conversion processing is performed by a controller. The present technology can be applied to, for example, an image encoding device and an image decoding device that support ACT processing.

20 Claims, 12 Drawing Sheets

(58) Field of Classification Search
USPC .................................................. 375/240.01
See application file for complete search history.

(56) References Cited

U.S. PATENT DOCUMENTS

| | | | | |
|---|---|---|---|---|
| 2021/0289218 A1* | 9/2021 | Chen | ................... | H04N 19/157 |
| 2021/0392342 A1* | 12/2021 | Chen | ................... | H04N 19/176 |
| 2022/0377333 A1* | 11/2022 | Zhu | ................... | H04N 19/176 |
| 2023/0130958 A1* | 4/2023 | Kang | ................... | H04N 19/176 |
| | | | | 375/240.26 |
| 2023/0139083 A1* | 5/2023 | Zhao | ................... | H04N 19/186 |
| | | | | 375/240.02 |

OTHER PUBLICATIONS

Bross et al., "Versatile Video Coding (Draft 7)", Joint Video Experts Team (JVET) of ITU-T SG 16 WP 3 and ISO/IEC JTC 1/SC 29/WG 11, JVET-P2001-vE, Oct. 1-11, 2019, 19 pages.

Li et al., "On residual adaptive colour transform", Joint Collaborative Team on Video Coding (JCT-VC) of ITU-T SG 16 WP 3 and ISO/IEC JTC 1/SC 29/WG 11, JCTVC-S0086, Oct. 17-24, 2014, pp. 1-15.

Kondo et al., "A memory issue on adaptive color transform", Joint Video Experts Team (JVET) of ITU-T SG 16 WP 3 and ISO/IEC JTC 1/SC 29/WG 11, JVET-Q0162-v3, Jan. 7-17, 2020, pp. 1-5.

Xiu et al., "Support of adaptive color transform for 444 video coding in VVC", Joint Video Experts Team (JVET) of ITU-T SG 16 WP 3 and ISO/IEC JTC 1/SC 29/WG 11, JVET-P0517, Oct. 1-11, 2019, pp. 1-5.

Bross B. et al.: "Versatile Video Coding (Draft 8) ", 17. JVET Meeting; Jan 7, 2020-Jan. 17, 2020; Brussels; (The Joint Video Exploration Team of ISO/IEC JTC1/SC29/WG11 and ITU-T SG.16 ), No. JVET-Q2001-v5; JVET-Q2001 ; m52905 Jan. 19, 2020 (Jan. 19, 2020), pp. 1-491, XP030224284.

Kondo (Sony) K. et al.: "TU split for ACT", 130. MPEG Meeting; Apr. 20, 2020-Apr. 24, 2020; Alpbach; (Motion Picture Expert Group or ISO/IEC JTC1/SC29/WG11), No. m53537 ; JVET-R0378 Apr. 27, 2020 (Apr. 27, 2020), XP030287141.

\* cited by examiner

FIG. 4

| Sequence Parameter Set | Descriptor |
|---|---|
| seq_parameter_set_rbsp( ) { | |
| sps_decoding_parameter_set_id | u(4) |
| sps_video_parameter_set_id | u(4) |
| sps_max_sublayers_minus1 | u(3) |
| sps_reserved_zero_4bits | u(4) |
| ... | |
| if (chroma_format_idc == 3) { | |
| sps_act_enabled_flag | u(1) |
| ... | |
| if (sps_act_enabled_flag) { | |
| sps_log2_act_max_size_minus2 | ue(v) |
| } | |
| ... | |
| rbsp_trailing_bits( ) | |

FIG. 5

| Coding Unit | Descriptor |
|---|---|
| coding_unit(x0, y0, cbWidth, cbHeight, cqtDepth, treeType, modeType) { | |
| ... | |
| if(CuPredMode[chType][x0][y0] == MODE_INTRA && sps_act_enabled_flag && cbWidth<=MaxActSize && cbHeight<=MaxActSize && treeType == SINGLE_TREE) | |
| cu_act_enabled_flag | ae(v) |
| } | |
| if(CuPredMode[chType][x0][y0] != MODE_INTRA && !pred_mode_plt_flag && general_merge_flag[x0][y0] == 0) | |
| cu_cbf_flag | |
| if(cu_cbf_flag) { | |
| ... | |
| if(sps_act_enabled_flag && CuPredMode[chType][x0][y0] != MODE_INTRA && cbWidth<=MaxActSize && cbHeight<=MaxActSize && treeType == SINGLE_TREE) | |
| cu_act_enabled_flag | ae(v) |
| ... | |
| } | |
| ... | |
| } | |

FIG. 6

| Sequence Parameter Set | Descriptor |
|---|---|
| seq_parameter_set_rbsp( ) { | |
| sps_decoding_parameter_set_id | u(4) |
| ... | |
| sps_max_luma_transform_size_64_flag | u(1) |
| ... | |
| if(chroma_format_idc == 3) { | |
| if(!sps_max_luma_transform_size_64_flag) | |
| sps_act_enabled_flag | u(1) |
| sps_palette_enabled_flag | u(1) |
| } | |
| ... | |
| rbsp_trailing_bits( ) | |
| } | |

IMAGE PROCESSING DEVICE AND IMAGE PROCESSING METHOD

CROSS-REFERENCE TO RELATED APPLICATIONS

The present application is based on PCT filing PCT/JP2020/047392, filed Dec. 18, 2020, which claims priority to U.S. Provisional Application No. 62/951,896, filed Dec. 20, 2019 and U.S. Provisional Application No. 62/954,120, filed Dec. 27, 2019, the entire contents of each are incorporated herein by reference.

TECHNICAL FIELD

The present disclosure relates to an image processing device and an image processing method, and more particularly, to an image processing device and an image processing method that make it possible to avoid an increase in memory size.

BACKGROUND ART

A device has conventionally been spreading that treats image information digitally and, at that time, compresses and encodes an image by adopting an encoding method that performs encoding by orthogonal transform such as discrete cosine transform and motion compensation, by using redundancy specific to image information, for the purpose of transmission and accumulation of information with high efficiency.

Examples of the encoding method include Moving Picture Experts Group (MPEG), H.264 and MPEG-4 Part 10 (Advanced Video Coding, hereinafter referred to as H.264/AVC), and H.265 and MPEG-H Part 2 (High Efficiency Video Coding, hereinafter referred to as H.265/HEVC).

Furthermore, to further improve encoding efficiency for Advanced Video Coding (AVC), High Efficiency Video Coding (HEVC), and the like, standardization of a coding scheme called Versatile Video Coding (VVC) is in progress (see support of embodiments described later).

As disclosed in Non-Patent Document 1, in VVC, a technology is disclosed related to Adaptive Color Transform (ACT) that adaptively performs conversion of a color space of an image.

CITATION LIST

Non-Patent Document

Non-Patent Document 1: Xiaoyu Xiu, Yi-Wen Chen, Tsung Chuan Ma, Hong-Jheng Jhu, Xianglin Wang, Support of adaptive color transform for 444 video coding in VVC, JVET-P0517_r1 (version 3—date 2019-10-11)

SUMMARY OF THE INVENTION

Problems to be Solved by the Invention

By the way, in a case where ACT processing is applied to convert an RGB color space into a YCgCo color space, for example, it is necessary to temporarily accumulate a YCgCo residual signal output as a result of the processing. For that reason, it is considered that the memory size for accumulating the YCgCo residual signal needs to be increased depending on the block size of an orthogonal transform block in orthogonal transform processing performed after the ACT processing.

The present disclosure has been made in view of such a situation, and makes it possible to avoid an increase in memory size.

Solutions to Problems

An image processing device of a first aspect of the present disclosure includes: an adaptive color conversion unit that performs adaptive color conversion processing of adaptively performing conversion of a color space of an image to be encoded, on a residual signal of the image; an orthogonal transform unit that performs orthogonal transform processing for each of orthogonal transform blocks that are units of processing, on a residual signal of the image or on a residual signal of the image subjected to the adaptive color conversion processing; and a controller that performs control related to application of the adaptive color conversion processing.

An image processing method of the first aspect of the present disclosure includes: performing adaptive color conversion processing of adaptively performing conversion of a color space of an image to be encoded on a residual signal of the image; performing orthogonal transform processing for each of orthogonal transform blocks that are units of processing, on a residual signal of the image or on a residual signal of the image subjected to the adaptive color conversion processing; and performing control related to application of the adaptive color conversion processing.

In the first aspect of the present disclosure, adaptive color conversion processing of adaptively performing conversion of a color space of an image to be encoded is performed on a residual signal of the image; orthogonal transform processing is performed for each of orthogonal transform blocks that are units of processing, on a residual signal of the image or on a residual signal of the image subjected to the adaptive color conversion processing; and control related to application of the adaptive color conversion processing is performed.

An image processing device of a second aspect of the present disclosure includes: an inverse orthogonal transform unit that acquires a residual signal of an image to be decoded, by performing inverse orthogonal transform processing for each of orthogonal transform blocks that are units of processing, on a transform coefficient obtained when orthogonal transform processing is performed on the residual signal on an encoding side; an inverse adaptive color conversion unit that performs, on the residual signal, inverse adaptive color conversion processing of adaptively performing inverse conversion of a color space of an image; and a controller that performs control related to application of the inverse adaptive color conversion processing.

An image processing method of the second aspect of the present disclosure includes: acquiring a residual signal of an image to be decoded, by performing inverse orthogonal transform processing for each of orthogonal transform blocks that are units of processing, on a transform coefficient obtained when orthogonal transform processing is performed on the residual signal on an encoding side; performing, on the residual signal, inverse adaptive color conversion processing of adaptively performing inverse conversion of a color space of an image; and performing control related to application of the inverse adaptive color conversion processing.

In the second aspect of the present disclosure, inverse orthogonal transform processing is performed for each of orthogonal transform blocks that are units of processing, on a transform coefficient obtained when orthogonal transform processing is performed on a residual signal on an encoding side, whereby the residual signal of an image to be decoded is acquired; inverse adaptive color conversion processing of adaptively performing inverse conversion of a color space of an image is performed on the residual signal; and control related to application of the inverse adaptive color conversion processing is performed.

BRIEF DESCRIPTION OF DRAWINGS

FIG. 4 is a diagram showing an example of a parameter set of high level syntax.

FIG. 5 is a diagram showing an example of a coding unit of high level syntax.

FIG. 6 is a diagram showing an example of a parameter set of high level syntax.

MODE FOR CARRYING OUT THE INVENTION

Figure 1:
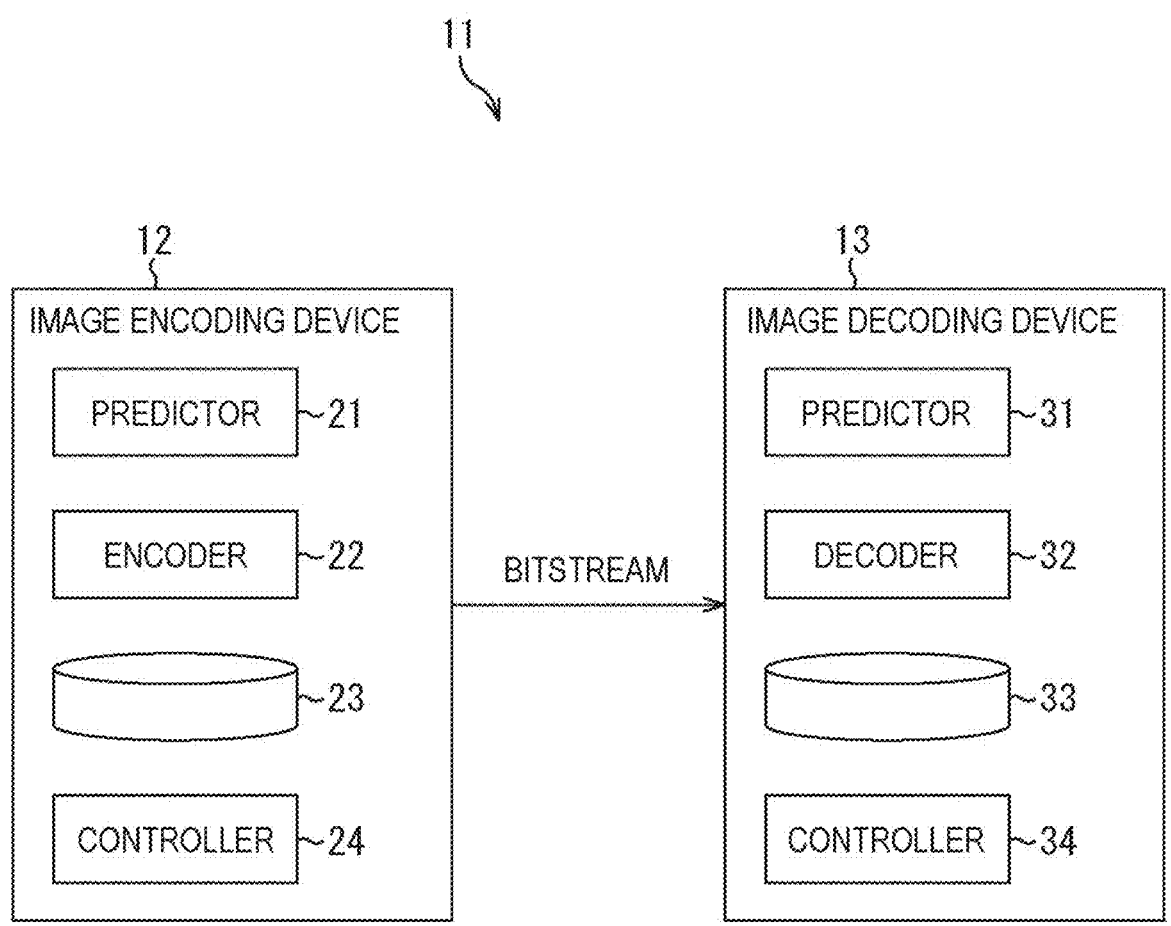
FIG. 1 is a block diagram illustrating a configuration example of an embodiment of an image processing system to which the present technology is applied.

<Document and the Like that Support Technical Contents and Technical Terms>

The scope disclosed in the present specification is not limited to the content of the embodiments, and the content of the following reference documents REF1 to REF5 known at the time of filing is also incorporated herein by reference. That is, the content described in the reference documents REF1 to REF5 is also a basis for determining support requirements. Moreover, the documents referred to in the reference documents REF1 to REF5 are also bases for determining the support requirements.

For example, even in a case where Quad-Tre Block Structure, Quad Tree Plus Binary Tree (QTBT), Block Structure, Multi-Type Tree (MTT) Block Structure, and the like are not directly defined in the detailed description of the invention, they are within the scope of the present disclosure and shall meet the support requirements of the claims. Furthermore, similarly, even in a case where technical terms, for example, parsing, syntax, semantics, and the like are not directly defined in the detailed description of the invention, they are within the scope of the present disclosure and shall meet the support requirements of the claims. Furthermore, equivalently, even in a case where technical applications, for example, Adaptive Color Transform (ACT) and the like are not directly defined in the detailed description of the invention, they are within the scope of the present disclosure and shall meet the support requirements of the claims.

REF1: Recommendation ITU-T H.264 (April/2017) "Advanced video coding for generic audiovisual services", April 2017

REF2: Recommendation ITU-T H.265 (February/2018) "High efficiency video coding", February 2018

REF3: Benjamin Bross, Jianle Chen, Shan Liu, Versatile Video Coding (Draft 7), JVET-P2001-v14 (version 14—date 2019-11-14)

REF4: Jianle Chen, Yan Ye, Seung Hwan Kim, Algorithm description for Versatile Video Coding and Test Model 7 (VTM 7), JVET-P2002-v1 (version 1—date 2019-11-10)

REF5: Xiaoyu Xiu, Yi-Wen Chen, Tsung-Chuan Ma, Hong-Jheng Jhu, Xianglin Wang, Support of adaptive color transform for 444 video coding in VVC, JVET-P0517 r1 (version 3—date 2019-10-11)

<Terms>

In this application, the following terms are defined as follows.

<Block>

"Block" (not a block indicating a processing unit) used for description as a partial area or a unit of processing of an image (picture) indicates an arbitrary partial area in a picture, unless otherwise specified, and the size, shape, characteristics, and the like are not limited. For example, the "block" includes an arbitrary partial area (unit of processing) such as the Transform Block (TB), Transform Unit (TU), Prediction Block (PB), Prediction Unit (PU), Smallest Coding Unit (SCU), Coding Unit (CU), Largest Coding Unit (LCU), Coding Tree Block (CTB), Coding Tree Unit (CTU), transformation block, sub-block, macroblock, tile, or slice.

<Specification of Block Size>

Furthermore, in specification of the size of such a block, the block size may not only be directly specified, but also be specified indirectly. For example, the block size may be specified by using identification information for identifying the size. Furthermore, for example, the block size may be specified by a ratio to or a difference from the size of a reference block (for example, the LCU, the SCU, and the like). For example, in a case where information for specifying the block size is transmitted as a syntax element or the like, the information for indirectly specifying the size as described above may be used as the information. By doing so, the amount of information can be reduced, and encoding efficiency can be improved in some cases. Furthermore, the specification of the block size also includes specification of a block size range (for example, specification of an allowable block size range, or the like).

<Unit of Information and Processing>

A unit of data in which the various types of information is set, and a unit of data targeted by the various types of processing each are arbitrary and are not limited to the examples described above. For example, these information and processes each may be set for each Transform Unit (TU), Transform Block (TB), Prediction Unit (PU), Prediction Block (PB), Coding Unit (CU), Largest Coding Unit (LCU), sub-block, block, tile, slice, picture, sequence, or component, or data in units of data of those may be targeted. Of course, the unit of data can be set for each piece of information or processing, and it is not necessary that the units of data of all the information and processes are unified. Note that, a storage location of these pieces of information is arbitrary, and may be stored in the header, parameter set, or the like of the unit of data described above. Furthermore, those may be stored in a plurality of locations.

<Control Information>

Control information related to the present technology may be transmitted from the encoding side to the decoding side. For example, control information (for example, enabled_flag) may be transmitted that controls whether or not the application of the present technology described above is permitted (or prohibited). Furthermore, for example, control information may be transmitted indicating an object to which the present technology is applied (or an object to which the present technology is not applied). For example, control information may be transmitted that specifies the block size (upper limit, lower limit, or both), frame, component, layer, or the like to which the present technology is applied (or for which application is permitted or prohibited).

<Flag>

Note that, in the present specification, the "flag" is information for identifying a plurality of states, and includes not only information used for identifying two states of true (1) or false (0), but also information capable of identifying three or more states. Thus, values that can be taken by the "flag" may be, for example, two values of I/O, or three or more values. That is, the number of bits constituting the "flag" is arbitrary, and may be 1 bit or a plurality of bits. Furthermore, the identification information (including the flag) is assumed to include not only the identification information in the bitstream but also difference information of the identification information with respect to a certain reference information in the bitstream, so that the "flag" and "identification information" include not only the information but also the difference information with respect to the reference information, in the present specification.

<Associating Metadata>

Furthermore, various types of information (metadata, and the like) regarding the coded data (bitstream) may be transmitted or recorded in any form as long as those are associated with the coded data. Here, a term "associate" means that, for example, when one data is processed, the other data is made to be usable (linkable). That is, the data associated with each other may be collected as one data, or may be individual data. For example, information associated with coded data (image) may be transmitted on a transmission path different from that for the coded data (image). Furthermore, for example, the information associated with the coded data (image) may be recorded in a recording medium different from that for the coded data (image) (or in a different recording area of the same recording medium). Note that, this "association" may be a part of data, not the entire data. For example, an image and information corresponding to the image may be associated with each other in an arbitrary unit such as a plurality of frames, one frame, or a portion within a frame.

Note that, in the present specification, terms "combine", "multiplex", "add", "integrate", "include", "store", "put in", "enclose", "insert", and the like mean to combine a plurality of objects into one, for example, to combine coded data and metadata into one, and the terms mean one method of the "associate" described above. Furthermore, in the present specification, encoding includes not only entire processing of converting an image into a bitstream but also a part of the processing. For example, it includes not only processing including prediction processing, orthogonal transform, quantization, arithmetic coding, and the like, but also processing collectively referring to quantization and arithmetic coding, processing including prediction processing, quantization, and arithmetic coding, and the like. Similarly, decoding includes not only entire processing of converting a bitstream into an image but also a part of the processing. For example, it includes not only processing including inverse arithmetic decoding, inverse quantization, inverse orthogonal transform, prediction processing, and the like, but also processing including inverse arithmetic decoding and inverse quantization, processing including inverse arithmetic decoding, inverse quantization, and prediction processing, and the like.

A prediction block means a block that is a unit of processing when inter prediction is performed, and also includes a sub-block in the prediction block. Furthermore, in a case where the unit of processing is unified with those of an orthogonal transform block that is a unit of processing when the orthogonal transform is performed and an encoding block that is a unit of processing when encoding processing is performed, the prediction block, the orthogonal transform block, and the encoding block mean the same block.

The inter prediction is a generic term for processing involving prediction between frames (prediction blocks), such as derivation of a motion vector by motion detection (Motion Prediction/Motion Estimation) and motion compensation using a motion vector, and includes some processing (for example, only motion compensation processing) or all types of processing (for example, motion detection processing+motion compensation processing) used for generating a predicted image. An inter prediction mode inclusively means variables (parameters) referred to when the inter prediction mode is derived, such as a mode number, an index of the mode number, a block size of the prediction block, and a size of the sub-block that is a unit of processing in the prediction block when the inter prediction is performed.

In the present disclosure, identification data for identifying a plurality of patterns can also be set as syntax of a bitstream. In this case, a decoder can perform processing more efficiently by parsing and referring to the identification data. A method (data) for identifying the block size includes not only a method for digitizing (bit conversion) the block size itself but also a method (data) for identifying a difference value with respect to a block size (maximum block size, minimum block size, or the like) that is a reference.

Hereinafter, a specific embodiment to which the present technology is applied will be described in detail with reference to the drawings.

<Configuration Example of Image Processing System>

FIG. 1 is a block diagram illustrating a configuration example of an embodiment of an image processing system to which the present technology is applied.

As illustrated in FIG. 1, an image processing system 11 includes an image encoding device 12 and an image decoding device 13. For example, in the image processing system 11, an image input to the image encoding device 12 is encoded, a bitstream obtained by the encoding is transmitted to the image decoding device 13, and a decoded image decoded from the bitstream in the image decoding device 13 is output.

As illustrated in FIG. 1, the image encoding device 12 includes a predictor 21, an encoder 22, a storage unit 23, and a controller 24, and the image decoding device 13 includes a predictor 31, a decoder 32, a storage unit 33, and a controller 34.

The predictor 21 performs inter prediction or intra prediction to generate a predicted image. For example, in a case where inter prediction is performed, the predictor 21 generates the predicted image using a prediction block (Prediction Unit) having a predetermined block size as a unit of processing.

The encoder 22 encodes the image input to the image encoding device 12 in accordance with a predetermined encoding method using an encoding block (Coding Unit) of a predetermined block size as a unit of processing, and transmits a bitstream of coded data to the image decoding device 13. Furthermore, the bitstream includes parameters and the like related to blocks as described later with reference to FIGS. 4 to 6.

The storage unit 23 stores various types of data that need to be stored when an image is encoded in the image encoding device 12. For example, as described later with reference to FIG. 2, the storage unit 23 temporarily accumulates a YCgCo residual signal 1 output by ACT processing and a YCgCo residual signal 2 to be subjected to IACT processing.

The controller 24 performs control related to application of the ACT processing and the IACT processing as described later with reference to FIG. 2.

The predictor 31 performs inter prediction or intra prediction to generate a predicted image. For example, in a case where inter prediction is performed, the predictor 21 generates the predicted image using a prediction block having a predetermined block size as a unit of processing.

The decoder 32 decodes the bitstream transmitted from the image encoding device 12 in correspondence with the encoding method by the encoder 22, and outputs the decoded image.

The storage unit 33 stores various types of data that need to be stored when an image is decoded in the image decoding device 13. For example, as described later with reference to FIG. 3, the storage unit 33 temporarily accumulates the YCgCo residual signal 2 to be subjected to the IACT processing.

The controller 34 performs control related to application of the IACT processing as described later with reference to FIG. 3.

In the image processing system 11 configured as described above, control related to the ACT processing and the IACT processing is appropriately performed, whereby an increase can be avoided in memory size of the storage unit 23 and the storage unit 33.

A configuration of the image encoding device 12 will be further described with reference to a block diagram illustrated in FIG. 2.

Figure 2:
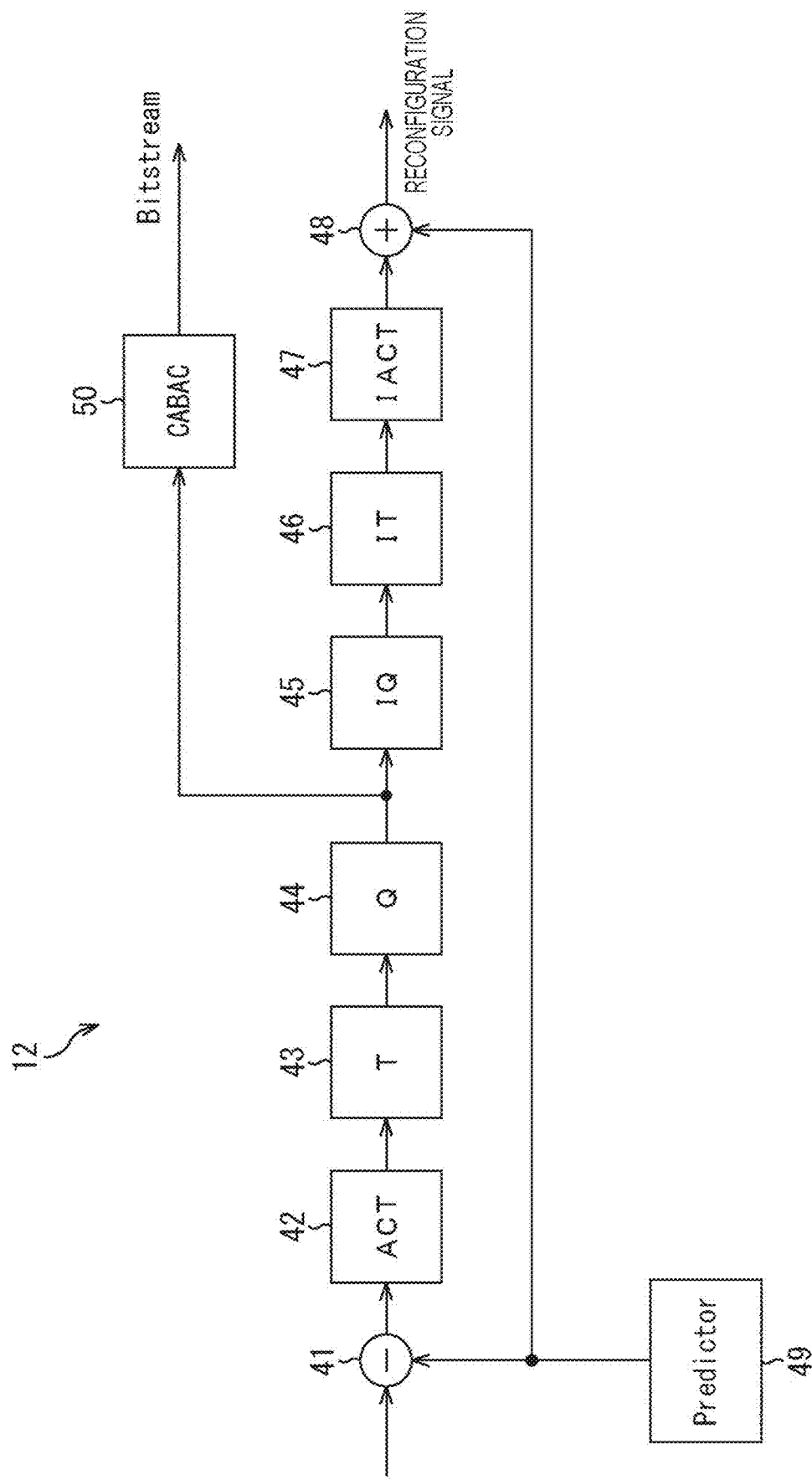
FIG. 2 is a diagram illustrating a configuration example of an image encoding device.

As illustrated in FIG. 2, the image encoding device 12 includes a calculation unit 41, an adaptive color conversion unit 42, an orthogonal transform unit 43, a quantization unit 44, an inverse quantization unit 45, an inverse orthogonal transform unit 46, an inverse adaptive color conversion unit 47, a calculation unit 48, a predictor 49, and an encoder 50.

The calculation unit 41 performs calculation of subtracting a predicted image supplied from the predictor 49 from the image input to the image encoding device 12, and supplies an RGB residual signal 1 that is difference information obtained by the calculation to the adaptive color conversion unit 42.

The adaptive color conversion unit 42 performs the ACT processing of adaptively performing conversion of a color space of an image to be encoded, on the RGB residual signal 1 supplied from the calculation unit 41. For example, the adaptive color conversion unit 42 performs the ACT processing of converting an RGB color space into a YCgCo color space, thereby acquiring the YCgCo residual signal 1 from the RGB residual signal 1 to supply the YCgCo residual signal 1 to the orthogonal transform unit 43.

The orthogonal transform unit 43 acquires a transform coefficient by performing orthogonal transform processing of performing orthogonal transform for each of orthogonal transform blocks that are units of processing, on the YCgCo residual signal 1 supplied from the adaptive color conversion unit 42, and supplies the transform coefficient to the quantization unit 44. Furthermore, in a case where control is performed so that the ACT processing is not performed in the adaptive color conversion unit 42, the orthogonal transform unit 43 can perform the orthogonal transform processing on the RGB residual signal 1 supplied from the calculation unit 41.

The quantization unit 44 quantizes the transform coefficient supplied from the orthogonal transform unit 43 and supplies the transform coefficient to the inverse quantization unit 45 and the encoder 50. The inverse quantization unit 45 performs inverse quantization on the transform coefficient quantized in the quantization unit 44 and supplies the transform coefficient to the inverse orthogonal transform unit 46.

The inverse orthogonal transform unit 46 acquires the YCgCo residual signal 2 by performing inverse orthogonal transform processing of performing inverse orthogonal transform for each of the orthogonal transform blocks that are units of processing, on the transform coefficient supplied from the inverse quantization unit 45, and supplies the YCgCo residual signal 2 to the inverse adaptive color conversion unit 47. Furthermore, in a case where control is performed so that the IACT processing is not performed in the inverse adaptive color conversion unit 47, the inverse orthogonal transform unit 46 can acquire an RGB residual signal 2 by the inverse orthogonal transform processing and supply the RGB residual signal 2 to the calculation unit 48.

The inverse adaptive color conversion unit 47 performs the IACT processing of adaptively performing inverse conversion of the color space of the image, on the YCgCo residual signal 2 supplied from the inverse orthogonal transform unit 46. For example, the inverse adaptive color conversion unit 47 performs the IACT processing of inversely converting the YCgCo color space into the RGB color space, thereby acquiring the RGB residual signal 2 from the YCgCo residual signal 2 to supply the RGB residual signal 2 to the calculation unit 48.

The calculation unit 48 locally reconfigures (decodes) the image by performing calculation of adding the RGB residual signal 2 supplied from the inverse adaptive color conversion unit 47 to the predicted image supplied from the predictor 49, and outputs a reconfiguration signal representing the reconfigured image. Furthermore, in a case where control is performed so that the IACT processing is not performed in the inverse adaptive color conversion unit 47, the calculation unit 48 can reconfigure (decodes) the image from the RGB residual signal 2 supplied from the inverse orthogonal transform unit 46.

The predictor 49 corresponds to the predictor 21 in FIG. 1, generates the predicted image predicted from the image reconfigured in the calculation unit 48, and supplies the predicted image to the calculation unit 41 and the calculation unit 48.

The encoder 50 corresponds to the encoder 22 in FIG. 1, and performs encoding processing using, for example, Context-based Adaptive Binary Arithmetic Coding (CABAC) that is an encoding method with high encoding efficiency for consecutive equal values, or the like, on the transform coefficient quantized in the quantization unit 44. As a result, the encoder 50 acquires the bitstream of the coded data and transmits the bitstream to the image decoding device 13.

In the image encoding device 12 configured as described above, the ACT processing of converting the RGB residual signal 1 into the YCgCo residual signal 1 is performed in the adaptive color conversion unit 42, whereby a degree of energy concentration of the signal can be improved. As described above, by improving the degree of energy concentration of the signal, the image encoding device 12 can express an image signal with a small amount of code, and improvement of encoding efficiency is expected.

A configuration of the image decoding device 13 will be further described with reference to a block diagram illustrated in FIG. 3.

Figure 3:
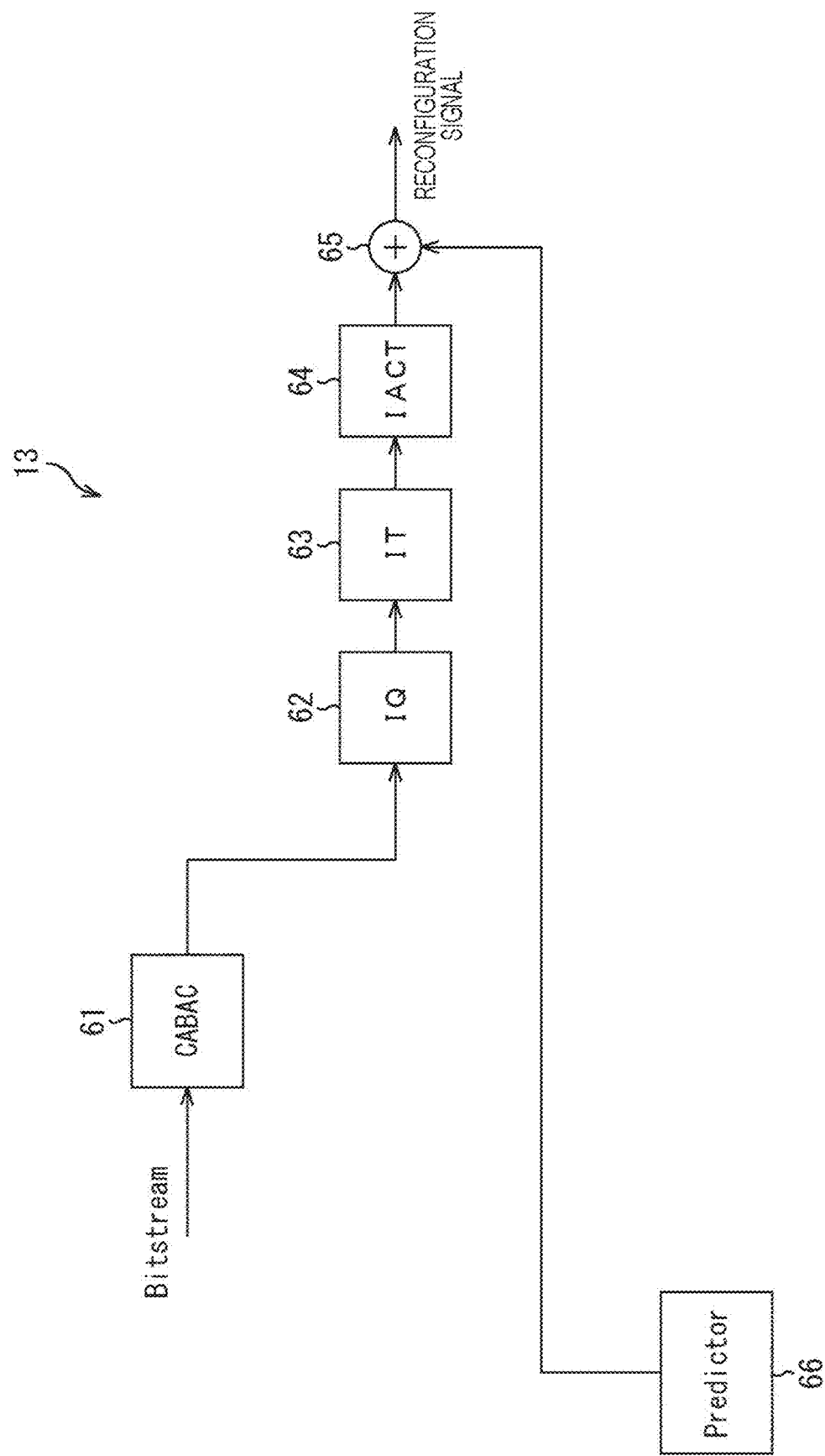
FIG. 3 is a diagram illustrating a configuration example of an image decoding device.

As illustrated in FIG. 3, the image decoding device 13 includes a decoder 61, an inverse quantization unit 62, an inverse orthogonal transform unit 63, an inverse adaptive color conversion unit 64, a calculation unit 65, and a predictor 66.

The decoder 61 corresponds to the decoder 32 in FIG. 1, and performs decoding processing using an encoding method (for example, CABAC) corresponding to encoding by the encoder 50 in FIG. 2, on the bitstream of the coded data transmitted from the image encoding device 12. As a result, the decoder 61 acquires the quantized transform coefficient from the bitstream of the coded data and supplies the transform coefficient to the inverse quantization unit 62. At this time, the decoder 61 also acquires parameters and the like related to blocks included in the bitstream of the coded data and described later with reference to FIGS. 4 to 6.

The inverse quantization unit 62 performs inverse quantization on the quantized transform coefficient supplied from the decoder 61 and supplies the transform coefficient to the inverse orthogonal transform unit 63.

The inverse orthogonal transform unit 63 acquires the YCgCo residual signal 2 by performing inverse orthogonal transform processing of performing inverse orthogonal transform for each of the orthogonal transform blocks that are units of processing, on the transform coefficient supplied from the inverse quantization unit 62, and supplies the YCgCo residual signal 2 to the inverse adaptive color conversion unit 64. Furthermore, in a case where control is performed so that the IACT processing is not performed in the inverse adaptive color conversion unit 64, the inverse orthogonal transform unit 63 can supply the RGB residual signal 2 acquired by the inverse orthogonal transform processing to the calculation unit 65.

Similarly to the inverse adaptive color conversion unit 47 in FIG. 2, the inverse adaptive color conversion unit 64 performs the IACT processing of adaptively performing inverse conversion of the color space of the image, on the YCgCo residual signal 2 supplied from the inverse orthogonal transform unit 63. For example, the inverse adaptive color conversion unit 64 performs the IACT processing of inversely converting the YCgCo color space into the RGB color space, thereby acquiring the RGB residual signal 2 from the YCgCo residual signal 2 to supply the RGB residual signal 2 to the calculation unit 65.

The calculation unit 65 locally reconfigures (decodes) the image by performing calculation of adding the RGB residual signal 2 supplied from the inverse adaptive color conversion unit 64 to the predicted image supplied from the predictor 66, and outputs a reconfiguration signal representing the reconfigured image. Furthermore, in a case where control is performed so that the IACT processing is not performed in the inverse adaptive color conversion unit 64, the calculation unit 65 can reconfigure (decodes) the image from the RGB residual signal 2 supplied from the inverse orthogonal transform unit 63.

The predictor 66 corresponds to the predictor 31 in FIG. 1, generates the predicted image predicted from the image reconfigured in the calculation unit 65, and supplies the predicted image to the calculation unit 65, similarly to the predictor 49 in FIG. 2.

The image decoding device 13 configured as described above can contribute to the improvement of the encoding efficiency similarly to the image encoding device 12.

The image processing system 11 is configured as described above, and the ACT processing of converting the RGB residual signal 1 into the YCgCo residual signal 1 is performed in the adaptive color conversion unit 42, and the IACT processing of converting the YCgCo residual signal 2 into the RGB residual signal 2 is performed in the inverse adaptive color conversion units 47 and 64.

At this time, in the image encoding device 12, the ACT processing is performed in units of three components in the adaptive color conversion unit 42, so that the YCgCo residual signal 1 for three components is temporarily stored in the storage unit 23 in FIG. 1. Thus, in the storage unit 23, the YCgCo residual signal 1 is stored for three components corresponding to the block size (for example, 32×32) of the orthogonal transform block in the orthogonal transform unit 43. Furthermore, in the storage unit 23, the YCgCo residual signal 2 is stored for three components corresponding to the block size (for example, 32×32) of the orthogonal transform block in the inverse orthogonal transform unit 46.

Similarly, in the image decoding device 13, the YCgCo residual signal 2 for three components corresponding to the block size (for example, 32×32) of the orthogonal transform block in the inverse orthogonal transform unit 63 is stored in the storage unit 33 in FIG. 1.

As described above, in the image processing system 11, in a case where the ACT processing and the IACT processing are applied, it is necessary to increase the memory size of the storage unit 23 so that it is possible to store the YCgCo residual signal 1 and the YCgCo residual signal 2 according to the block size of the orthogonal transform block. Similarly, in a case where the ACT processing and the IACT processing are applied, it is necessary to increase the memory size of the storage unit 33 so that it is possible to store the YCgCo residual signal 2 according to the block size of the orthogonal transform block. For this reason, as the memory size increases, mounting cost of the image processing system 11 increases.

Thus, in the image processing system 11, control related to application of the ACT processing by the adaptive color conversion unit 42 and the IACT processing by the inverse adaptive color conversion unit 47 is appropriately performed by the controller 24, whereby an increase can be avoided in memory size of the storage unit 23. Similarly, in the image processing system 11, control related to application of the IACT processing by the inverse adaptive color conversion unit 64 is appropriately performed by the controller 34, whereby an increase can be avoided in memory size of the storage unit 33. Thus, the image processing system 11 can suppress an increase in mounting cost as an increase in the memory size is avoided.

<First Concept Related to Application of ACT Processing and IACT Processing>

For example, in the image processing system 11, control is performed so that the ACT processing and the IACT processing are applied in a case where a predetermined limitation (for example, a limitation of size, area, shape, or the like) is provided for an encoding block when an image is encoded.

For example, parameters of the encoding block for performing such limitation include a size, a long side size, a short side size, an area, and a shape. The size includes 16×16, 16×8, 8×16, and the like. The long side size includes 16 for a 16×8 block. The short side size includes 8 for a 16×8 block. The area includes 16×16, 16×8, and the like. The shape includes a square shape, a rectangular shape, and the like.

Since 32×32 has conventionally been used as the block size of the orthogonal transform block in the orthogonal transform processing and the inverse orthogonal transform processing, a memory size has been required capable of storing a YCgCo residual signal for three components with a block size of 32×32.

On the other hand, in the image processing system 11, a limitation is provided of less than or equal to a predetermined size (for example, 16×16) for the block size of the encoding block when the ACT processing and the IACT processing are applied. Due to such a limitation, the storage unit 23 is only required to have a memory size of only storing the YCgCo residual signal 1 for three components with a block size of 16×16. Similarly, for the YCgCo residual signal 2, the storage unit 23 and the storage unit 33 are only required to have a memory size of only storing the YCgCo residual signal 2 for three components with a block size of 16×16.

For example, regarding syntax of a bitstream, a parameter (size, area, shape, or the like) of the encoding block is considered, as a condition under which the ACT processing and the IACT processing are applied. That is, when a flag indicating that the ACT processing is applied is transmitted, the image encoding device 12 confirms that the block size of the encoding block is less than or equal to the predetermined size (for example, 16×16). Then, the syntax is determined so that the flag indicating that the ACT processing is applied is transmitted only in a case where the block size of the encoding block is less than or equal to the predetermined size (for example, 16×16), and the flag indicating that the ACT processing is applied is not transmitted in a case where the block size is larger than the predetermined size (for example, 16×16).

As a result, in the image processing system 11, in a case where the block size of the encoding block is larger than the predetermined size, it is not necessary to transmit the flag indicating that the ACT processing is applied, and the flag can be removed from the bitstream, so that improvement of the encoding efficiency can be expected. Furthermore, by not transmitting such a flag that does not need to be transmitted, it is possible to remove an ambiguous signal in syntax of the bitstream.

Furthermore, a case will be described where Versatile Video Coding (VVC) is used as an encoding method. In the case where VVC is used as the encoding method, 64×64 can be used as the block size of the orthogonal transform block in the orthogonal transform processing and the inverse orthogonal transform processing. For that reason, in the case where VVC is used as the encoding method, a memory size has been required capable of storing the YCgCo residual signal for three components in a block size of 64×64.

Thus, in the image processing system 11, in the case where VVC is used as the encoding method, for example, a limitation is provided of less than or equal to 32×32 for the block size of the encoding block when the ACT processing and the IACT processing are applied. Due to such a limitation, the storage unit 23 is only required to have a memory size of only storing the YCgCo residual signal 1 for three components with a block size of 32×32. Similarly, for the YCgCo residual signal 2, the storage unit 23 and the storage unit 33 are only required to have a memory size of only storing the YCgCo residual signal 2 for three components with a block size of 32×32.

Note that also in a case where High Efficiency Video Coding (HEVC) is used as an encoding method, a mechanism for performing the ACT processing and the IACT processing is provided, and in HEVC, the maximum block size of the orthogonal transform block in the orthogonal transform processing and the inverse orthogonal transform processing has been 32×32 in terms of standards. On the other hand, in VVC, it has become possible to support 64×64 as the maximum block size of the orthogonal transform block, the increase in memory size becomes larger than that in HEVC. Thus, in the image processing system 11, in a case where VVC is used as the encoding method, when the ACT processing and the IACT processing are applied, the orthogonal transform block in the orthogonal transform processing and the inverse orthogonal transform processing is limited, whereby it becomes possible to perform processing with the same memory size as that in HEVC.

FIG. 4 shows an example of a parameter set of high level syntax.

In the parameter set shown in FIG. 4, in a case where sps_act_enabled_flag is 1, it is specified that the ACT processing and the IACT processing can be applied, and cu_act_enabled_flag may exist in coding unit syntax. On the other hand, in a case where sps_act_enabled_flag is 0, it is specified that the ACT processing and the IACT processing are not applied, and cu_act_enabled_flag does not exist in the coding unit syntax. Note that, in a case where sps_act_enabled_flag does not exist in the parameter set, sps_act_enabled_flag is estimated to be 0.

In the parameter set shown in FIG. 4, sps_log2_act_max_size_minus2 specifies the maximum block size used in the ACT processing and the IACT processing in a range of 0 to 7. Note that, in a case where sps_log2_act_max_size_minus2 does not exist in the parameter set, sps_log2_act_max_size_minus2 is estimated to be 0.

Furthermore, in a case where 1 is set, the MaxActSize variable is sufficiently smaller than sps_log2_act_max_size_minus2+2 (The variable MaxActSize is set equal to 1<< (sps_log2_act_max_size_minus2+2)).

For example, if 2 is set for sps_log2_act_max_size_minus2, the MaxActSize variable is 16 (=1<<4). As a result, it is possible to prohibit the ACT processing and the IACT processing from being performed with a size larger than MaxActSize.

FIG. 5 shows an example of a coding unit of high level syntax.

In the coding unit shown in FIG. 5, in a case where cu_act_enabled_flag is 1, it is specified that a residual of the current coding unit is coded in the YCgCo color space. On the other hand, in a case where cu_act_enabled_flag is 0, it is specified that the residual of the current coding unit is coded in an original color space. Note that, in a case where cu_act_enabled_flag does not exist, cu_act_enabled_flag is estimated to be 0.

Here, by adding a condition that the width of the encoding block is less than or equal to the maximum size of the block size in the ACT processing and the IACT processing and that the height of the encoding block is less than or equal to the maximum size of the block size in the ACT processing and the IACT processing (&& cbWidth<=MaxActSize && cbHeight<=MaxActSize) to a condition for transmitting cu_act_enabled_flag, it is possible to limit the memory size used in the ACT processing and the IACT processing.

Furthermore, by adding a condition that the width of the encoding block or the height of the encoding block is less than or equal to the maximum size of the block size in the ACT processing and the IACT processing (&& (cbWidth*cbHeight)<=(MaxActSize*MaxActSize)) to the condition for transmitting cu_act_enabled_flag, it is also possible to limit the memory size. In this case, even if one side exceeds MaxActSize, if the other side is small and satisfies the conditions described above, the ACT processing and the IACT processing can be applied.

<Second Concept Related to Application of ACT Processing and IACT Processing>

In a second concept, even in a case where the block size of the encoding block or an expectation block used in the image processing system 11 is large, control is performed so that the orthogonal transform processing and the inverse orthogonal transform processing are performed by using an orthogonal transform block having a small size obtained by dividing the block size of the encoding block or the expectation block, and control is performed so that the ACT processing and the IACT processing are applied. That is, even in the case where the block size of the encoding block or the expectation block used in the image processing system 11 is large, when the ACT processing and the IACT processing are applied, the orthogonal transform processing and the inverse orthogonal transform processing are performed in the orthogonal transform block smaller than the block size of the encoding block or the expectation block.

For example, in a case where the block size of the encoding block is 64×64 and the block size of the prediction block of inter prediction is 64×64, the block size of 64×64 has usually been used also in the orthogonal transform block. On the other hand, in the image processing system 11, even in a similar case, orthogonal transform blocks (for example, four blocks having a block size of 32×32) having a block size divided into smaller than 64×64 are automatically used when the ACT processing and the IACT processing are applied.

For example, by referring to a control signal indicating that the ACT processing is applied, in a case where the ACT processing is applied, control is performed so that the orthogonal transform processing and the inverse orthogonal transform processing are performed using the orthogonal transform blocks having a small block size obtained by dividing the block size of the encoding block or the prediction block at that time.

Thus, in the image processing system 11, control is performed according to such a second concept, whereby the block size of the orthogonal transform block is reduced in the orthogonal transform processing and inverse orthogonal transform processing, and an increase can be avoided in memory size required when the ACT processing and the IACT processing are applied. For example, the storage unit 23 that stores the YCbCo residual signal 1 can have a memory size for three components with a block size of 32×32 instead of a memory size for three components with a block size of 64×64. As a result, in the image processing system 11, an increase can be suppressed in mounting cost.

<Third Concept Related to Application of ACT Processing and IACT Processing>

In a third concept, control is performed so that the ACT processing and the IACT processing are applied in a case where a small size is used as the maximum block size of the orthogonal transform block in the orthogonal transform processing and the inverse orthogonal transform processing.

For example, in the image processing system 11, 32 and 64 are defined as the maximum block size of the orthogonal transform block. Then, the controller 24 causes the adaptive color conversion unit 42 to perform the ACT processing and the inverse adaptive color conversion unit 47 to perform the IACT processing only in a case where 32 is used as the maximum block size of the orthogonal transform block. Similarly, the controller 34 causes the inverse adaptive color conversion unit 64 to perform the IACT processing only in a case where 32 is used as the maximum block size of the orthogonal transform block.

Such control according to the third concept can be implemented by using sps_max_luma_transform_size_64_flag included in a parameter set of high level syntax.

FIG. 6 shows an example of the parameter set of high level syntax used in the image processing system 11.

For example, in a case where sps_max_luma_transform_size_64_flag is 0, 32 is set to be used as the maximum block size of the orthogonal transform block. On the other hand, in a case where sps_max_luma_transform_size_64_flag is 1, 64 is set to be used as the maximum block size of the orthogonal transform block.

Thus, in the image processing system 11, control is performed so that the ACT processing and the IACT processing are applied only in the case where sps_max_luma_transform_size_64_flag is 0. That is, in the image processing system 11, in the case where sps_max_luma_transform_size_64_flag is 1, the ACT processing and the IACT processing are not applied.

Then, in the case where sps_max_luma_transform_size 64 flag is 0, the controller 24 sets 1 indicating that adaptive color conversion processing is applied to sps_act_enabled_flag indicating whether or not the adaptive color conversion processing is applied, and transmits the sps_max_luma_transform_size_64_flag to the image decoding device 13. In this case, cu_act_enabled_flag may also be included in the coding unit syntax. Note that, in the case where sps_act_enabled_flag is 0, it indicates that the adaptive color conversion processing is not applied, and in this case, cu_act_enabled_flag is not included in the coding unit syntax. Here, in a case where sps_act_enabled_flag is not included in the parameter set, sps_act_enabled_flag is estimated to be 0.

As described above, in the case where sps_max_luma_transform_size_64_flag is 0, the maximum block size of the orthogonal transform block is limited to 32, and thus, in the image processing system 11, an increase can be avoided in memory size required when the ACT processing and the IACT processing are applied.

For example, in a case where such control is not performed, that is, in a case where the maximum block size of the orthogonal transform block can be 64, the storage unit 23 and the storage unit 33 need a memory size capable of storing the YCgCo residual signal for three components with a block size of 64×64. On the other hand, control is performed so that the ACT processing and the IACT processing are applied only when the maximum block size of the orthogonal transform block is limited to 32, whereby the storage unit 23 and the storage unit 33 are only required to have a memory size of only storing the YCgCo residual signal for three components with a block size of 32×32.

Thus, in the image processing system 11, control is performed according to such a third concept, whereby an increase can be avoided in memory size, and as a result, an increase can be suppressed in mounting cost.

<Configuration Example of Computer-Based System>

Figure 7:
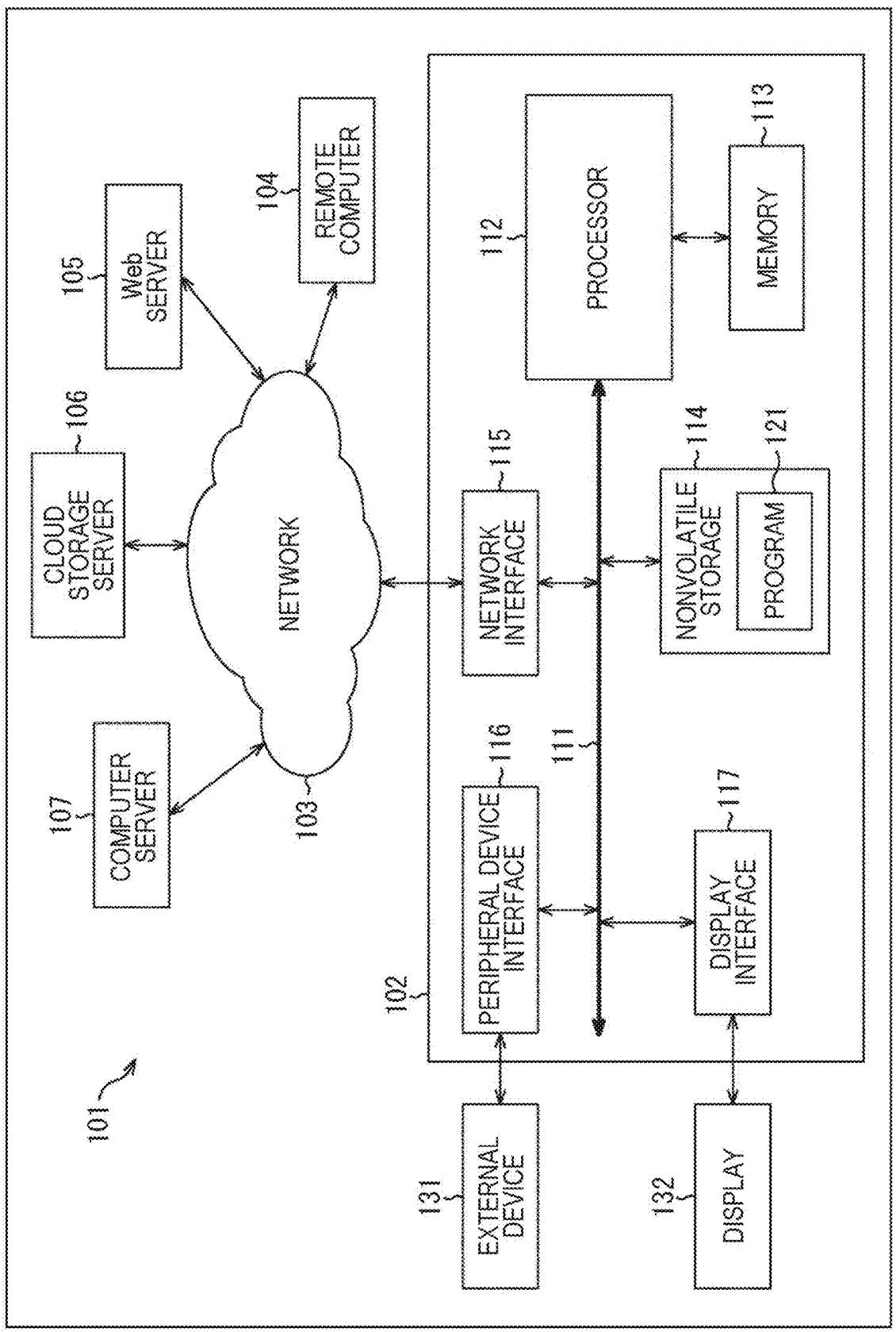
FIG. 7 is a block diagram illustrating a configuration example of an embodiment of a computer-based system to which the present technology is applied.

FIG. 7 is a block diagram illustrating a configuration example of an embodiment of a computer-based system to which the present technology is applied.

FIG. 7 is a block diagram illustrating a configuration example of a network system in which one or a plurality of computers, servers, and the like are connected to each other via a network. Note that hardware and software environment illustrated in the embodiment in FIG. 7 is illustrated as an example where a platform can be provided for implementing software and/or a method according to the present disclosure.

As illustrated in FIG. 7, a network system 101 includes a computer 102, a network 103, a remote computer 104, a web server 105, a cloud storage server 106, and a computer server 107. Here, in the present embodiment, a plurality of instances is executed by one or a plurality of functional blocks illustrated in FIG. 7.

Furthermore, in FIG. 7, a detailed configuration of the computer 102 is illustrated. Note that the functional blocks illustrated in the computer 102 are illustrated to establish exemplary functions and are not limited to such a configuration. Furthermore, although detailed configurations of the remote computer 104, the web server 105, the cloud storage server 106, and the computer server 107 are not illustrated, these include components similar to the functional blocks illustrated in the computer 102.

As the computer 102, it is possible to use a personal computer, a desktop computer, a laptop computer, a tablet computer, a netbook computer, a personal digital assistant, a smartphone, or other programmable electronic devices capable of communicating with other devices on a network.

Then, the computer 102 includes a bus 111, a processor 112, a memory 113, a nonvolatile storage 114, a network interface 115, a peripheral device interface 116, and a display interface 117. Each of these functions may be implemented in an individual electronic subsystem (an integrated circuit chip or a combination of a chip and associated devices) in certain embodiments, or some of the functions may be combined and implemented in a single chip (a system on a chip or a System on Chip (SoC)) in other embodiments.

As the bus 111, it is possible to adopt various proprietary or industry standard high speed parallel or serial peripheral interconnect buses.

As the processor 112, it is possible to adopt one designed and/or manufactured as one or a plurality of single or multi-chip microprocessors.

The memory 113 and the nonvolatile storage 114 are storage media that can be read by the computer 102. For example, as the memory 113, it is possible to adopt any suitable volatile storage device, such as a Dynamic Random Access Memory (DRAM), a Static RAM (SRAM), or the like. As the nonvolatile storage 114, it is possible to adopt at least one or more of a flexible disk, a hard disk, a Solid State Drive (SSD), a Read Only Memory (ROM), an Erasable and Programmable Read Only Memory (EPROM), a flash memory, a compact disk (CD or CD-ROM), a Digital Versatile Disc (DVD), a card-type memory, or a stick-type memory.

Furthermore, a program 121 is stored in the nonvolatile storage 114. The program 121 is, for example, a set of machine-readable instructions and/or data used to create, manage, and control a certain software function. Note that, in a configuration in which the memory 113 is much faster than the nonvolatile storage 114, the program 121 can be transferred from the nonvolatile storage 114 to the memory 113 before being executed by the processor 112.

The computer 102 can communicate with and interact with other computers via the network 103 via the network interface 115. The network 103 can adopt a configuration including wired, wireless, or optical fiber connection by, for example, a Local Area Network (LAN), a Wide Area Network (WAN) such as the Internet, or a combination of the LAN and the WAN. In general, the network 103 includes any combination of connections and protocols that support communication between two or more computers and associated devices.

The peripheral device interface 116 can input and output data to and from other devices that can be locally connected to the computer 102. For example, the peripheral device interface 116 provides a connection to an external device 131. As the external device 131, a keyboard, a mouse, a keypad, a touch screen, and/or other suitable input devices are used. The external device 131 can also include a portable computer-readable storage medium, for example, a thumb drive, a portable optical disk or magnetic disk, a memory card, and the like.

In embodiments of the present disclosure, for example, software and data used to implement the program 121 may be stored in such a portable computer-readable storage medium. In such embodiments, the software may be loaded into the nonvolatile storage 114, or directly into the memory 113 via the peripheral device interface 116. The peripheral device interface 116 may use an industry standard, for example, RS-232, Universal Serial Bus (USB), or the like, for connection with the external device 131.

The display interface 117 can connect the computer 102 to a display 132, and it is possible to present a command line or graphical user interface to a user of the computer 102 by using the display 132. For example, as the display interface 117, an industry standard can be adopted, such as Video Graphics Array (VGA), Digital Visual Interface (DVI), DisplayPort, or High-Definition Multimedia Interface (HDMI) (registered trademark).

<Configuration Example of Image Encoding Device>

Figure 8:
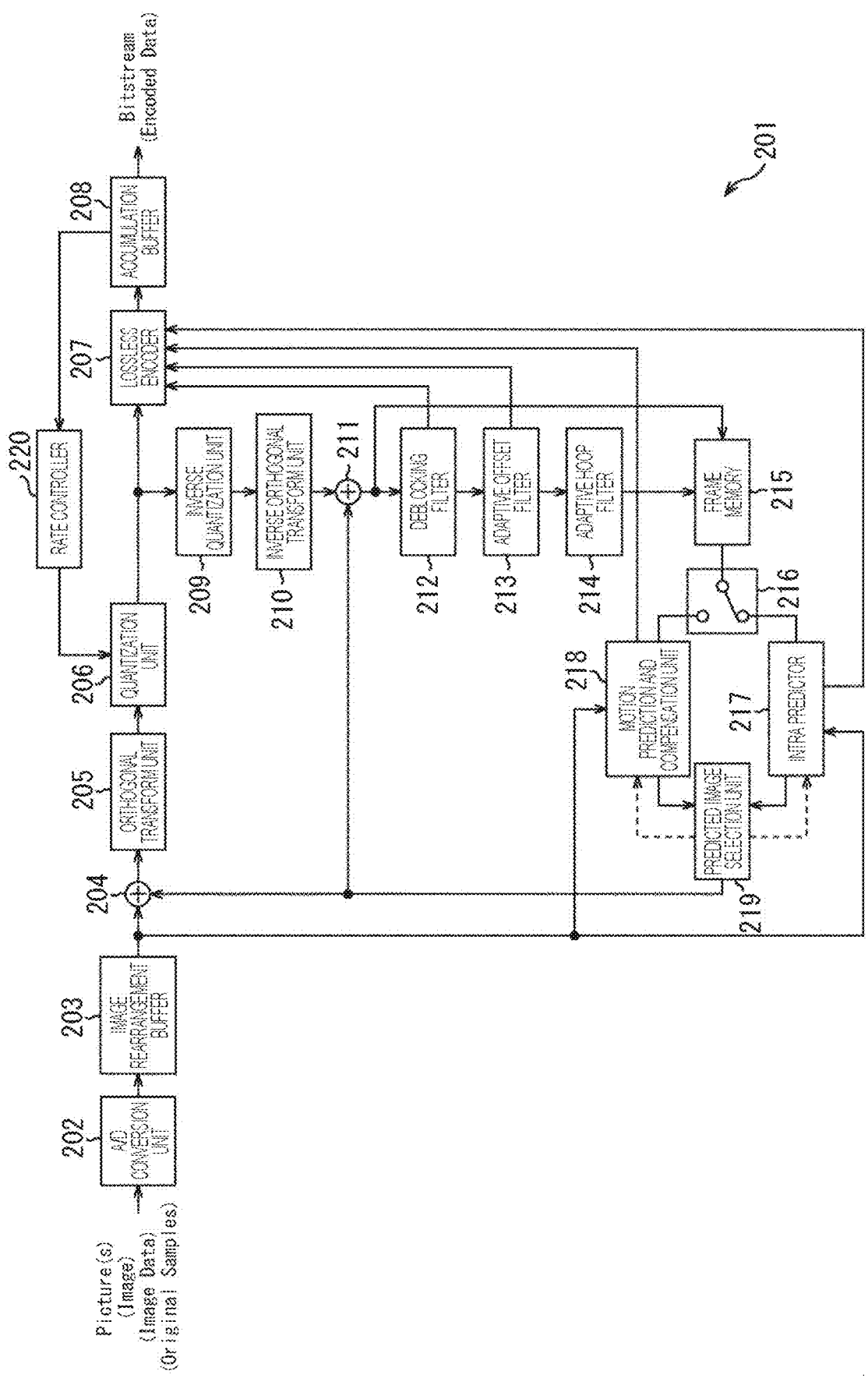
FIG. 8 is a block diagram illustrating a configuration example of an embodiment of an image encoding device.

FIG. 8 is a block diagram illustrating a configuration example of an embodiment of an image encoding device as an image processing device to which the present disclosure is applied.

An image encoding device 201 illustrated in FIG. 8 encodes image data by using prediction processing. Here, as the encoding method, for example, a Versatile Video Coding (VVC) method, a High Efficiency Video Coding (HEVC) method, or the like is used.

The image encoding device 201 in FIG. 8 includes an A/D conversion unit 202, a screen rearrangement buffer 203, a calculation unit 204, an orthogonal transform unit 205, a quantization unit 206, a lossless encoder 207, and an accumulation buffer 208. Furthermore, the image encoding device 201 includes an inverse quantization unit 209, an inverse orthogonal transform unit 210, a calculation unit 211, a deblocking filter 212, an adaptive offset filter 213, an adaptive loop filter 214, a frame memory 215, a selection unit 216, an intra predictor 217, a motion prediction and compensation unit 218, a predicted image selection unit 219, and a rate controller 220.

The A/D conversion unit 202 performs A/D conversion on the input image data (Picture(s)) and supplies the converted image data to the screen rearrangement buffer 203. Note that an image of digital data may be input, without providing the A/D conversion unit 202.

The screen rearrangement buffer 203 stores the image data supplied from the A/D conversion unit 202, and rearranges the images of frames stored in the display order in the order of frames for encoding depending on a group of picture (GOP) structure. The screen rearrangement buffer 203 outputs the images in which the order of the frames has been rearranged to the calculation unit 204, the intra predictor 217, and the motion prediction and compensation unit 218.

The calculation unit 204 subtracts the predicted image supplied from the intra predictor 217 or the motion prediction and compensation unit 218 via the predicted image selection unit 219 from the image output from the screen rearrangement buffer 203, and outputs the difference information to the orthogonal transform unit 205.

For example, in the case of an image on which intra encoding is performed, the calculation unit 204 subtracts the predicted image supplied from the intra predictor 217 from the image output from the screen rearrangement buffer 203. Furthermore, for example, in the case of an image on which inter encoding is performed, the calculation unit 204 subtracts the predicted image supplied from the motion prediction and compensation unit 218 from the image output from the screen rearrangement buffer 203.

The orthogonal transform unit 205 performs orthogonal transform such as discrete cosine transform or Karhunen-Loeve transform on the difference information supplied from the calculation unit 204, and supplies the transform coefficient to the quantization unit 206.

The quantization unit 206 quantizes the transform coefficient output from the orthogonal transform unit 205. The quantization unit 206 supplies the quantized transform coefficient to the lossless encoder 207.

The lossless encoder 207 performs lossless encoding such as variable-length coding and arithmetic coding on the quantized transform coefficient.

The lossless encoder 207 acquires parameters such as information indicating an intra prediction mode from the intra predictor 217, and acquires parameters such as information indicating the inter prediction mode and motion vector information from the motion prediction and compensation unit 218.

The lossless encoder 207 encodes the quantized transform coefficient and encodes each acquired parameter (syntax element) to be a part of (to be multiplexed to) header information of coded data. The lossless encoder 207 supplies the coded data obtained by encoding to the accumulation buffer 208 for accumulation.

For example, in the lossless encoder 207, lossless encoding processing is performed, such as variable-length coding or arithmetic coding. Examples of the variable-length coding include Context-Adaptive Variable Length Coding (CAVLC). Examples of the arithmetic coding include Context-Adaptive Binary Arithmetic Coding (CABAC).

The accumulation buffer 208 temporarily holds an encoded stream (Encoded Data) supplied from the lossless encoder 207, and outputs the encoded stream as an encoded image subjected to encoding to, for example, a recording device or a transmission path (not illustrated) in a subsequent stage, at a predetermined timing. That is, the accumulation buffer 208 is also a transmission unit that transmits the encoded stream.

Furthermore, the transform coefficient quantized in the quantization unit 206 is also supplied to the inverse quantization unit 209. The inverse quantization unit 209 inversely quantizes the quantized transform coefficient by a method corresponding to the quantization by the quantization unit 206. The inverse quantization unit 209 supplies the obtained transform coefficient to the inverse orthogonal transform unit 210.

The inverse orthogonal transform unit 210 performs inverse orthogonal transform on the supplied transform coefficient by a method corresponding to the orthogonal transform processing by the orthogonal transform unit 205. An output subjected to the inverse orthogonal transform (restored difference information) is supplied to the calculation unit 211.

The calculation unit 211 adds the predicted image supplied from the intra predictor 217 or the motion prediction and compensation unit 218 via the predicted image selection unit 219 to an inverse orthogonal transform result supplied from the inverse orthogonal transform unit 210, that is, the restored difference information, to obtain a locally decoded image (decoded image).

For example, in a case where the difference information corresponds to an image on which intra encoding is performed, the calculation unit 211 adds the predicted image supplied from the intra predictor 217 to the difference information. Furthermore, for example, in a case where the difference information corresponds to an image on which inter encoding is performed, the calculation unit 211 adds the predicted image supplied from the motion prediction and compensation unit 218 to the difference information.

The decoded image that is a result of the addition is supplied to the deblocking filter 212 and the frame memory 215.

The deblocking filter 212 suppresses block distortion of the decoded image by appropriately performing deblocking filter processing on the image from the calculation unit 211, and supplies a result of the filter processing to the adaptive offset filter 213. The deblocking filter 212 has parameters $\beta$ and Tc obtained on the basis of a quantization parameter QP. The parameters $\beta$ and Tc are threshold values (parameters) used for determination related to the deblocking filter.

Note that $\beta$ and Tc that are parameters of the deblocking filter 212 are extended from $\beta$ and Tc defined in the HEVC scheme. Offsets of the parameters $\beta$ and Tc are encoded in the lossless encoder 207 as parameters of the deblocking filter and transmitted to an image decoding device 301 in FIG. 10 described later.

The adaptive offset filter 213 performs offset filter (Sample adaptive offset (SAO)) processing for mainly suppressing ringing, on the image filtered by the deblocking filter 212.

There are a total of nine types of offset filters including two types of band offsets, six types of edge offsets, and no offset. The adaptive offset filter 213 performs filter processing on the image filtered by the deblocking filter 212, by using a quad-tree structure in which the type of offset filter is determined for each divided area and an offset value for each divided area. The adaptive offset filter 213 supplies the image after the filter processing to the adaptive loop filter 214.

Note that, in the image encoding device 201, the quad-tree structure and the offset value for each divided area are calculated by the adaptive offset filter 213 and used. The calculated quad-tree structure and the offset value for each divided area are encoded in the lossless encoder 207 as adaptive offset parameters and transmitted to the image decoding device 301 in FIG. 10 described later.

The adaptive loop filter 214 performs adaptive loop filter (ALF) processing, for each unit of processing, by using a filter coefficient, on the image filtered by the adaptive offset filter 213. In the adaptive loop filter 214, for example, a two-dimensional Wiener filter is used as the filter. Of course, a filter other than the Wiener filter may be used. The adaptive loop filter 214 supplies a filter processing result to the frame memory 215.

Note that, although not illustrated in the example of FIG. 8, in the image encoding device 201, the filter coefficient is calculated by the adaptive loop filter 214 to minimize a residual from an original image from the screen rearrangement buffer 203, for each unit of processing, and used. The calculated filter coefficient is encoded in the lossless encoder 207 as an adaptive loop filter parameter and transmitted to the image decoding device 301 in FIG. 10 described later.

The frame memory 215 outputs an accumulated reference image to the intra predictor 217 or the motion prediction and compensation unit 218 via the selection unit 216 at a predetermined timing.

For example, in the case of an image on which intra encoding is performed, the frame memory 215 supplies the reference image to the intra predictor 217 via the selection unit 216. Furthermore, for example, in a case where inter encoding is performed, the frame memory 215 supplies the reference image to the motion prediction and compensation unit 218 via the selection unit 216.

In a case where the reference image supplied from the frame memory 215 is an image to be subjected to intra encoding, the selection unit 216 supplies the reference image to the intra predictor 217. Furthermore, in a case where the reference image supplied from the frame memory 215 is an image to be subjected to inter encoding, the selection unit 216 supplies the reference image to the motion prediction and compensation unit 218.

The intra predictor 217 performs intra prediction (intra screen prediction) that generates a predicted image by using pixel values in a screen. The intra predictor 217 performs intra prediction in a plurality of modes (intra prediction modes).

The intra predictor 217 generates predicted images in all intra prediction modes, evaluates each predicted image, and selects an optimum mode. When the optimum intra prediction mode is selected, the intra predictor 217 supplies the predicted image generated in the optimum mode to the calculation unit 204 and the calculation unit 211 via the predicted image selection unit 219.

Furthermore, as described above, the intra predictor 217 appropriately supplies parameters such as intra prediction mode information indicating an adopted intra prediction mode to the lossless encoder 207.

The motion prediction and compensation unit 218 performs motion prediction on an image on which inter encoding is performed, by using the input image supplied from the screen rearrangement buffer 203 and the reference image supplied from the frame memory 215 via the selection unit 216. Furthermore, the motion prediction and compensation unit 218 performs motion compensation processing depending on a motion vector detected by the motion prediction, and generates a predicted image (inter predicted image information).

The motion prediction and compensation unit 218 performs inter prediction processing in all candidate inter prediction modes, and generates a predicted image. The motion prediction and compensation unit 218 supplies the generated predicted image to the calculation unit 204 and the calculation unit 211 via the predicted image selection unit 219. Furthermore, the motion prediction and compensation unit 218 supplies parameters such as inter prediction mode information indicating an adopted inter prediction mode and motion vector information indicating the calculated motion vector to the lossless encoder 207.

The predicted image selection unit 219 supplies an output of the intra predictor 217 to the calculation unit 204 and the calculation unit 211 in the case of an image to be subjected to intra encoding, and supplies an output of the motion prediction and compensation unit 218 to the calculation unit 204 and the calculation unit 211 in the case of an image to be subjected to inter encoding.

The rate controller 220 controls a rate of quantization operation of the quantization unit 206 on the basis of a compressed image accumulated in the accumulation buffer 208 so that overflow or underflow does not occur.

The image encoding device 201 is configured as described above, the adaptive color conversion unit 42 (FIG. 2) is provided between the calculation unit 204 and the orthogonal transform unit 205, and the inverse adaptive color conversion unit 47 (FIG. 2) is provided between the inverse orthogonal transform unit 210 and the calculation unit 211. Then, in the image encoding device 201, control is performed according to the first to third concepts described above, whereby an increase can be avoided in memory size.

<Operation of Image Encoding Device>

Figure 9:
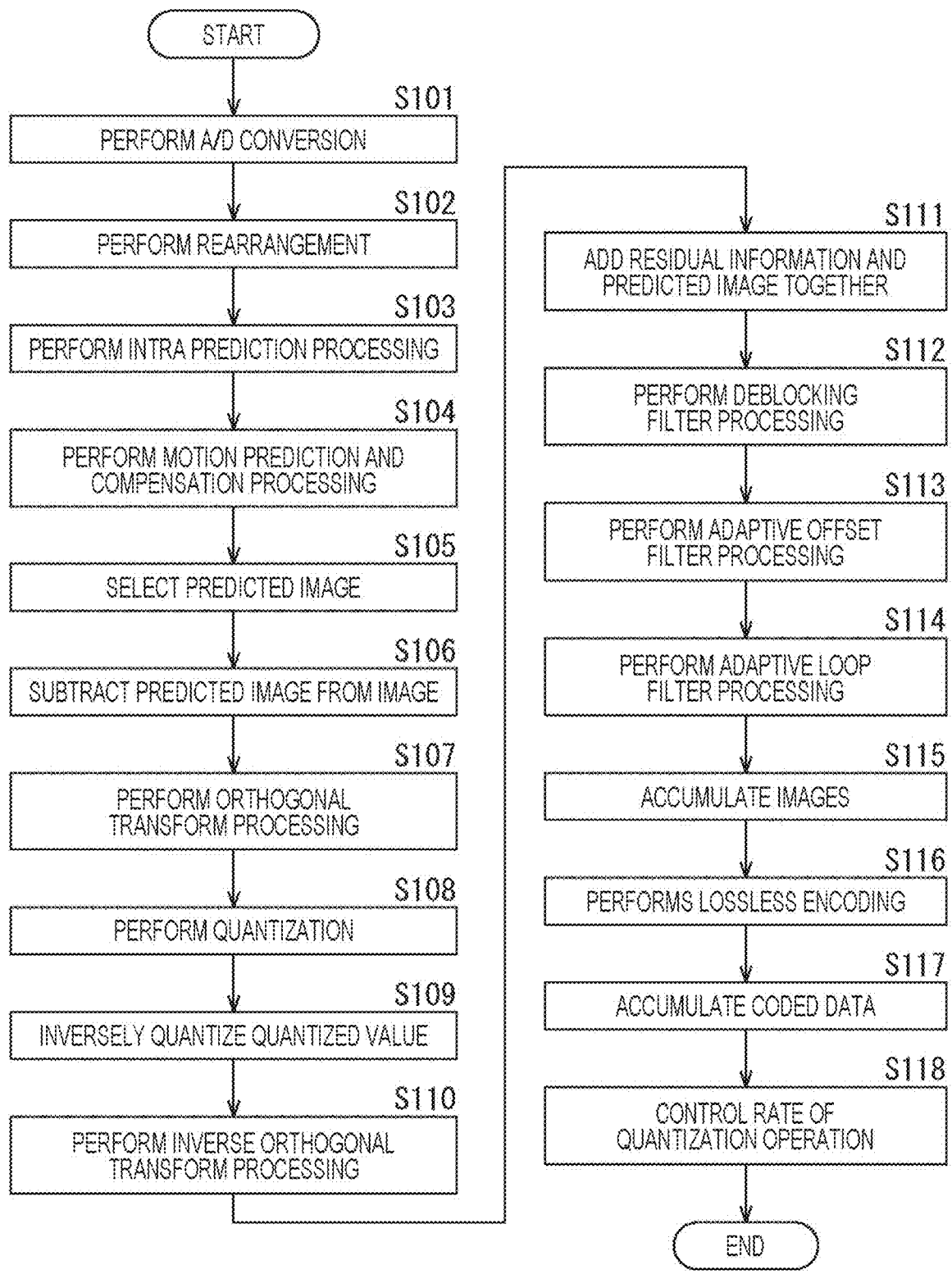
FIG. 9 is a flowchart describing encoding processing.

A flow of encoding processing executed by the image encoding device 201 as described above will be described with reference to FIG. 9.

In step S101, the A/D conversion unit 202 performs A/D conversion on an input image.

In step S102, the screen rearrangement buffer 203 stores the image subjected to A/D conversion by the A/D conversion unit 202, and performs rearrangement from the order of display of each picture to the order of encoding.

In a case where the image to be processed supplied from the screen rearrangement buffer 203 is an image of a block to be subjected to intra processing, a decoded image to be referred to is read from the frame memory 215 and supplied to the intra predictor 217 via the selection unit 216.

On the basis of these images, in step S103, the intra predictor 217 performs intra prediction on pixels of the block to be processed, in all candidate intra prediction modes. Note that, as the decoded pixel to be referred to, a pixel that is not filtered by the deblocking filter 212 is used.

With this processing, the intra prediction is performed in all the candidate intra prediction modes, and cost function values are calculated for all the candidate intra prediction modes. Then, an optimum intra prediction mode is selected on the basis of the calculated cost function values, and a predicted image generated by intra prediction of the optimum intra prediction mode and a cost function value thereof are supplied to the predicted image selection unit 219.

In a case where the image to be processed supplied from the screen rearrangement buffer 203 is an image to be subjected to inter processing, the image to be referred to is read from the frame memory 215 and supplied to the motion prediction and compensation unit 218 via the selection unit 216. On the basis of these images, in step S104, the motion prediction and compensation unit 218 performs motion prediction and compensation processing.

With this processing, motion prediction processing is performed in all the candidate inter prediction modes, cost function values are calculated for all the candidate inter prediction modes, and an optimum inter prediction mode is determined on the basis of the calculated cost function values. Then, a predicted image generated by the optimum inter prediction mode and a cost function value thereof are supplied to the predicted image selection unit 219.

In step S105, the predicted image selection unit 219 determines one of the optimum intra prediction mode or the optimum inter prediction mode as an optimum prediction mode on the basis of the cost function values output from the intra predictor 217 and the motion prediction and compensation unit 218. Then, the predicted image selection unit 219 selects a predicted image in the determined optimum prediction mode, and supplies the predicted image to the calculation units 204 and 211. The predicted image is used for calculation in steps S106 and S111 described later.

Note that selection information of the predicted image is supplied to the intra predictor 217 or the motion prediction and compensation unit 218. In a case where the predicted image in the optimum intra prediction mode is selected, the intra predictor 217 supplies information indicating the optimum intra prediction mode (that is, parameters related to intra prediction) to the lossless encoder 207.

In a case where the predicted image in the optimum inter prediction mode is selected, the motion prediction and compensation unit 218 outputs information indicating the optimum inter prediction mode and information corresponding to the optimum inter prediction mode (that is, parameters related to motion prediction) to the lossless encoder 207. Examples of the information corresponding to the optimum inter prediction mode include motion vector information and reference frame information.

In step S106, the calculation unit 204 calculates a difference between the image rearranged in step S102 and the predicted image selected in step S105. The predicted image is supplied from the motion prediction and compensation unit 218 in a case where inter prediction is performed, and from the intra predictor 217 in a case where intra prediction is performed, to the calculation unit 204 via the predicted image selection unit 219.

The amount of data of difference data is smaller than that of original image data. Thus, the amount of data can be compressed as compared with a case where the image is directly encoded.

In step S107, the orthogonal transform unit 205 performs orthogonal transform on the difference information supplied from the calculation unit 204. Specifically, orthogonal transform such as discrete cosine transform or Karhunen-Loeve transform is performed, and a transform coefficient is output.

In step S108, the quantization unit 206 quantizes the transform coefficient. At the time of this quantization, the rate is controlled as described in the processing of step S118 described later.

The difference information quantized as described above is locally decoded as follows. That is, in step S109, the inverse quantization unit 209 inversely quantizes the transform coefficient quantized by the quantization unit 206, with a characteristic corresponding to a characteristic of the quantization unit 206. In step S110, the inverse orthogonal transform unit 210 performs inverse orthogonal transform on the transform coefficient inversely quantized by the inverse quantization unit 209, with a characteristic corresponding to a characteristic of the orthogonal transform unit 205.

In step S111, the calculation unit 211 adds the predicted image input via the predicted image selection unit 219 to the locally decoded difference information to generate a locally decoded image (that is, image subjected to local decoding) (an image corresponding to an input to the calculation unit 204).

In step S112, the deblocking filter 212 performs deblocking filter processing on the image output from the calculation unit 211. At this time, parameters β and Tc extended from β and Tc defined in the HEVC scheme are used as the threshold values for determination related to the deblocking filter. The filtered image from the deblocking filter 212 is output to the adaptive offset filter 213.

Note that offsets of the parameters β and Tc input by the user operating an operation unit and the like and used in the deblocking filter 212 are supplied to the lossless encoder 207 as parameters of the deblocking filter.

In step S113, the adaptive offset filter 213 performs adaptive offset filter processing. With this processing, filter processing is performed on the image filtered by the deblocking filter 212, by using a quad-tree structure in which the type of offset filter is determined for each divided area and an offset value for each divided area. The filtered image is supplied to the adaptive loop filter 214.

Note that the determined quad-tree structure and the offset value for each divided area are supplied as adaptive offset parameters to the lossless encoder 207.

In step S114, the adaptive loop filter 214 performs adaptive loop filter processing on the image filtered by the adaptive offset filter 213. For example, on the image filtered by the adaptive offset filter 213, the filter processing is performed on the image for each unit of processing by using the filter coefficient, and the filter processing result is supplied to the frame memory 215.

In step S115, the frame memory 215 stores the filtered image. Note that an image not filtered by the deblocking filter 212, the adaptive offset filter 213, and the adaptive loop filter 214 is also supplied from the calculation unit 211 and stored in the frame memory 215.

On the other hand, the transform coefficient quantized in step S108 described above is also supplied to the lossless encoder 207. In step S116, the lossless encoder 207 encodes the quantized transform coefficient output from the quantization unit 206 and the supplied parameters. That is, a difference image is subjected to lossless encoding such as variable-length coding or arithmetic coding, and compressed. Here, examples of the parameters to be encoded include a parameter of the deblocking filter, a parameter of the adaptive offset filter, a parameter of the adaptive loop filter, a quantization parameter, motion vector information, reference frame information, prediction mode information, and the like.

In step S117, the accumulation buffer 208 accumulates the encoded difference image (that is, the encoded stream) as a compressed image. The compressed image accumulated in the accumulation buffer 208 is appropriately read and transmitted to the decoding side via the transmission path.

In step S118, the rate controller 220 controls the rate of the quantization operation of the quantization unit 206 on the basis of the compressed image accumulated in the accumulation buffer 208 so that overflow or underflow does not occur.

When the processing of step S118 ends, the encoding processing ends.

In the encoding processing as described above, the ACT processing by the adaptive color conversion unit 42 (FIG. 2) is performed between step S106 and step S107, and the IACT processing by the inverse adaptive color conversion unit 47 (FIG. 2) is performed between step S110 and step S111. Then, in the encoding processing, control related to application of the ACT processing and the IACT processing is performed in accordance with the first to third concepts described above.

<Configuration Example of Image Decoding Device>

Figure 10:
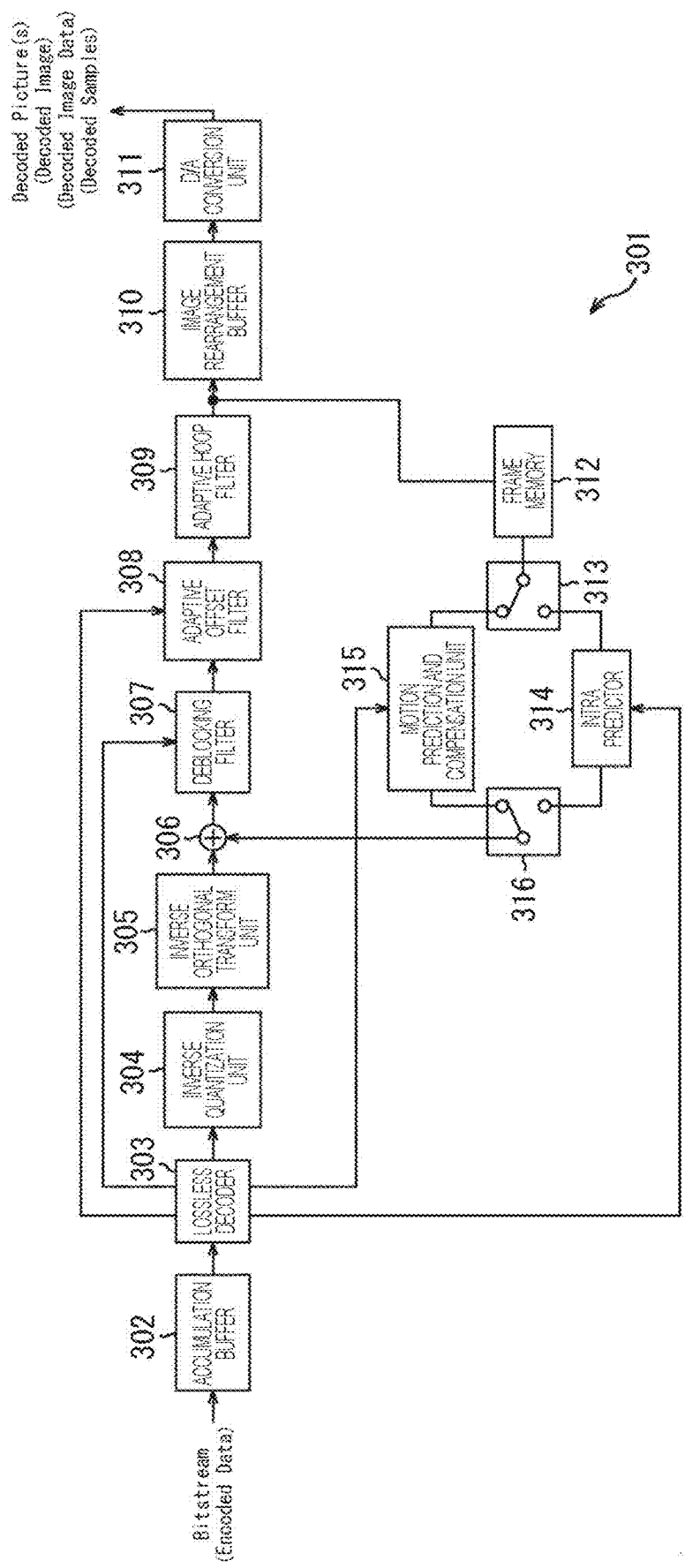
FIG. 10 is a block diagram illustrating a configuration example of an embodiment of an image decoding device.

FIG. 10 illustrates a configuration of an embodiment of an image decoding device as an image processing device to which the present disclosure is applied. The image decoding device 301 illustrated in FIG. 10 is a decoding device corresponding to the image encoding device 201 in FIG. 8.

An encoded stream (Encoded Data) encoded by the image encoding device 201 is transmitted to the image decoding device 301 corresponding to the image encoding device 201 via a predetermined transmission path, and is decoded.

As illustrated in FIG. 10, the image decoding device 301 includes an accumulation buffer 302, a lossless decoder 303, an inverse quantization unit 304, an inverse orthogonal transform unit 305, a calculation unit 306, a deblocking filter 307, an adaptive offset filter 308, an adaptive loop filter 309, a screen rearrangement buffer 310, a D/A conversion unit 311, a frame memory 312, a selection unit 313, an intra predictor 314, a motion prediction and compensation unit 315, and a selection unit 316.

The accumulation buffer 302 is also a receiving unit that receives the transmitted coded data. The accumulation buffer 302 receives and accumulates the transmitted coded data. The coded data is encoded by the image encoding device 201. The lossless decoder 303 decodes the coded data read from the accumulation buffer 302 at a predetermined timing by a method corresponding to the encoding method of the lossless encoder 207 in FIG. 8.

The lossless decoder 303 supplies parameters such as information indicating the decoded intra prediction mode to the intra predictor 314, and supplies parameters such as information indicating the inter prediction mode and motion vector information to the motion prediction and compensation unit 315. Furthermore, the lossless decoder 303 supplies the decoded parameter of the deblocking filter to the deblocking filter 307, and supplies the decoded adaptive offset parameter to the adaptive offset filter 308.

The inverse quantization unit 304 inversely quantizes coefficient data (quantization coefficient) obtained by being decoded by the lossless decoder 303 by a method corresponding to the quantization method of the quantization unit 206 in FIG. 8. That is, the inverse quantization unit 304 inversely quantizes the quantization coefficient by a method similar to that of the inverse quantization unit 209 in FIG. 8 by using the quantization parameter supplied from the image encoding device 201.

The inverse quantization unit 304 supplies the inversely quantized coefficient data, that is, an orthogonal transform coefficient to the inverse orthogonal transform unit 305. The inverse orthogonal transform unit 305 performs inverse orthogonal transform on the orthogonal transform coefficient by a method corresponding to an orthogonal transform method of the orthogonal transform unit 205 in FIG. 8, and obtains decoded residual data corresponding to residual data before being subjected to orthogonal transform in the image encoding device 201.

The decoded residual data obtained by being subjected to inverse orthogonal transform is supplied to the calculation unit 306. Furthermore, a predicted image is supplied to the calculation unit 306 from the intra predictor 314 or the motion prediction and compensation unit 315 via the selection unit 316.

The calculation unit 306 adds the decoded residual data and the predicted image together, to obtain decoded image data corresponding to image data before the predicted image is subtracted by the calculation unit 204 of the image encoding device 201. The calculation unit 306 supplies the decoded image data to the deblocking filter 307.

The deblocking filter 307 suppresses block distortion of the decoded image by appropriately performing deblocking filter processing on the image from the calculation unit 306, and supplies a result of the filter processing to the adaptive offset filter 308. The deblocking filter 307 is basically configured similarly to the deblocking filter 212 in FIG. 8. That is, the deblocking filter 307 has parameters β and Tc obtained on the basis of the quantization parameter. The parameters β and Tc are threshold values used for determination related to the deblocking filter.

Note that β and Tc that are parameters of the deblocking filter 307 are extended from β and Tc defined in the HEVC scheme. Offsets of the parameters β and Tc of the deblocking filter encoded by the image encoding device 201 are received by the image decoding device 301 as parameters of the deblocking filter, decoded by the lossless decoder 303, and used by the deblocking filter 307.

The adaptive offset filter 308 performs offset filter (SAO) processing for mainly suppressing ringing, on the image filtered by the deblocking filter 307.

The adaptive offset filter 308 performs filter processing on the image filtered by the deblocking filter 307, by using a quad-tree structure in which the type of offset filter is determined for each divided area and an offset value for each divided area. The adaptive offset filter 308 supplies the image after the filter processing to the adaptive loop filter 309.

Note that the quad-tree structure and the offset value for each divided area are calculated by the adaptive offset filter 213 of the image encoding device 201, encoded as the adaptive offset parameters, and transmitted. Then, the quad-tree structure and the offset value for each divided area encoded by the image encoding device 201 are received as the adaptive offset parameters by the image decoding device 301, decoded by the lossless decoder 303, and used by the adaptive offset filter 308.

The adaptive loop filter 309 performs filter processing, for each unit of processing, by using a filter coefficient, on the image filtered by the adaptive offset filter 308, and supplies a filter processing result to the frame memory 312 and the screen rearrangement buffer 310.

Note that, although not illustrated in the example of FIG. 10, in the image decoding device 301, the filter coefficient, which is calculated for each LUC by the adaptive loop filter 214 of the image encoding device 201 and encoded as the adaptive loop filter parameter and transmitted, is decoded by the lossless decoder 303 and used.

The screen rearrangement buffer 310 rearranges the images and supplies the rearranged images to the D/A conversion unit 311. That is, the order of the frames rearranged for the order of encoding by the screen rearrangement buffer 203 of FIG. 8 is rearranged in the original display order.

The D/A conversion unit 311 performs D/A conversion on the image (Decoded Picture(s)) supplied from the screen rearrangement buffer 310, outputs the image to a display (not illustrated), and displays the image. Note that an image may be output as digital data, without providing the D/A conversion unit 311.

An output of the adaptive loop filter 309 is further supplied to the frame memory 312.

The frame memory 312, the selection unit 313, the intra predictor 314, the motion prediction and compensation unit 315, and the selection unit 316 respectively correspond to the frame memory 215, the selection unit 216, the intra predictor 217, the motion prediction and compensation unit 218, and the predicted image selection unit 219 of the image encoding device 201.

The selection unit 313 reads an image to be subjected to inter processing and an image to be referred to from the frame memory 312, and supplies the images to the motion prediction and compensation unit 315. Furthermore, the selection unit 313 reads an image to be used for intra prediction from the frame memory 312 and supplies the image to the intra predictor 314.

Information indicating the intra prediction mode obtained by decoding the header information, and the like are appropriately supplied from the lossless decoder 303 to the intra predictor 314. On the basis of the information, the intra predictor 314 generates a predicted image from the reference image acquired from the frame memory 312, and supplies the generated predicted image to the selection unit 316.

Information (prediction mode information, motion vector information, reference frame information, flag, various parameters, and the like) obtained by decoding the header information is supplied from the lossless decoder 303 to the motion prediction and compensation unit 315.

The motion prediction and compensation unit 315 generates a predicted image from the reference image acquired from the frame memory 312 on the basis of the information supplied from the lossless decoder 303, and supplies the generated predicted image to the selection unit 316.

The selection unit 316 selects the predicted image generated by the motion prediction and compensation unit 315 or the intra predictor 314, and supplies the predicted image to the calculation unit 306.

The image decoding device 301 is configured as described above, and the inverse adaptive color conversion unit 64 (FIG. 3) is provided between the inverse orthogonal transform unit 305 and the calculation unit 306. Then, in the image decoding device 301, control is performed according to the first to third concepts described above, whereby an increase can be avoided in memory size.

<Operation of Image Decoding Device>

Figure 11:
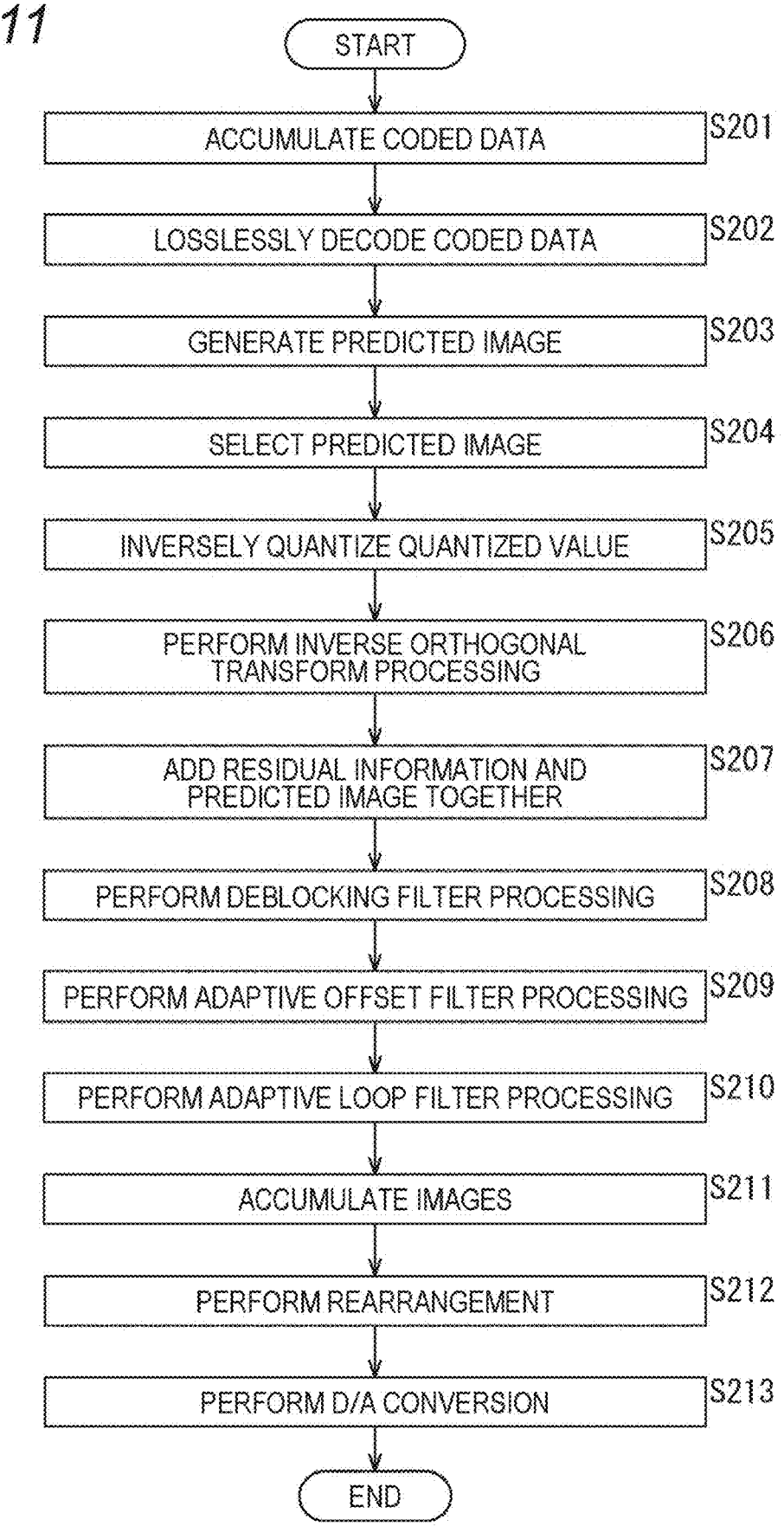
FIG. 11 is a flowchart describing decoding processing.

An example of a flow of decoding processing executed by the image decoding device 301 as described above will be described with reference to FIG. 11.

When the decoding processing is started, in step S201, the accumulation buffer 302 receives and accumulates transmitted encoded stream (data). In step S202, the lossless decoder 303 decodes coded data supplied from the accumulation buffer 302. An I picture, a P picture, and a B picture encoded by the lossless encoder 207 in FIG. 8 are decoded.

Prior to decoding the pictures, parameter information such as motion vector information, reference frame information, and prediction mode information (intra prediction mode or inter prediction mode) is also decoded.

In a case where the prediction mode information is the intra prediction mode information, the prediction mode information is supplied to the intra predictor 314. In a case where the prediction mode information is the inter prediction mode information, the prediction mode information and the corresponding motion vector information and the like are supplied to the motion prediction and compensation unit 315. Furthermore, the parameter of the deblocking filter and the adaptive offset parameter are also decoded and supplied to the deblocking filter 307 and the adaptive offset filter 308, respectively.

In step S203, the intra predictor 314 or the motion prediction and compensation unit 315 performs predicted image generation processing in correspondence with the prediction mode information supplied from the lossless decoder 303.

That is, in a case where the intra prediction mode information is supplied from the lossless decoder 303, the intra predictor 314 generates an intra predicted image in the intra prediction mode. In a case where the inter prediction mode information is supplied from the lossless decoder 303, the motion prediction and compensation unit 315 performs motion prediction and compensation processing in the inter prediction mode to generate an inter predicted image.

With this processing, the predicted image (intra predicted image) generated by the intra predictor 314 or the predicted image (inter predicted image) generated by the motion prediction and compensation unit 315 is supplied to the selection unit 316.

In step S204, the selection unit 316 selects a predicted image. That is, the predicted image generated by the intra predictor 314 or the predicted image generated by the motion prediction and compensation unit 315 is supplied. Thus, the supplied predicted image is selected and supplied to the calculation unit 306, and is added to an output of the inverse orthogonal transform unit 305 in step S207 described later.

In step S202 described above, the transform coefficient decoded by the lossless decoder 303 is also supplied to the inverse quantization unit 304. In step S205, the inverse quantization unit 304 inversely quantizes the transform coefficient decoded by the lossless decoder 303 with the characteristic corresponding to the characteristic of the quantization unit 206 in FIG. 8.

In step S206, the inverse orthogonal transform unit 305 performs inverse orthogonal transform on the transform coefficient inversely quantized by the inverse quantization unit 304 with the characteristic corresponding to the characteristic of the orthogonal transform unit 205 in FIG. 8. As a result, the difference information corresponding to an input of the orthogonal transform unit 205 in FIG. 8 (an output of the calculation unit 204) is decoded.

In step S207, the calculation unit 306 adds the predicted image selected in the processing in step S204 described above and input via the selection unit 316 to the difference information. As a result, an original image is decoded.

In step S208, the deblocking filter 307 performs deblocking filter processing on the image output from the calculation unit 306. At this time, parameters β and Tc extended from β and Tc defined in the HEVC scheme are used as the threshold values for determination related to the deblocking filter. The filtered image from the deblocking filter 307 is output to the adaptive offset filter 308. Note that, in the deblocking filter processing, the offsets of the parameters β and Tc of the deblocking filter supplied from the lossless decoder 303 are also used.

In step S209, the adaptive offset filter 308 performs adaptive offset filter processing. With this processing, filter processing is performed on the image filtered by the deblocking filter 307, by using a quad-tree structure in which the type of offset filter is determined for each divided area and an offset value for each divided area. The filtered image is supplied to the adaptive loop filter 309.

In step S210, the adaptive loop filter 309 performs adaptive loop filter processing on the image filtered by the adaptive offset filter 308. The adaptive loop filter 309 performs filter processing on the input image for each processing unit, by using the filter coefficient calculated for each unit of processing, and supplies a filter processing result to the screen rearrangement buffer 310 and the frame memory 312.

In step S211, the frame memory 312 stores the filtered image.

In step S212, the screen rearrangement buffer 310 rearranges the image after the adaptive loop filter 309, and then supplies the rearranged image to the D/A conversion unit 311. That is, the order of the frames rearranged for encoding by the screen rearrangement buffer 203 of image encoding device 201 is rearranged in the original display order.

In step S213, the D/A conversion unit 311 performs D/A conversion on the image rearranged by the screen rearrangement buffer 310, and outputs the converted image to a display (not illustrated) to display the image.

When the processing of step S213 ends, the decoding processing ends.

In the decoding processing as described above, the IACT processing by the inverse adaptive color conversion unit 64 (FIG. 3) is performed between step S206 and step S207. Then, in the decoding processing, control related to application of the ACT processing and the IACT processing is performed in accordance with the first to third concepts described above.

<Configuration Example of Computer>

Next, a series of processing (image processing method) described above can be performed by hardware or software. In a case where the series of processing is performed by software, a program constituting the software is installed in a general-purpose computer or the like.

Figure 12:
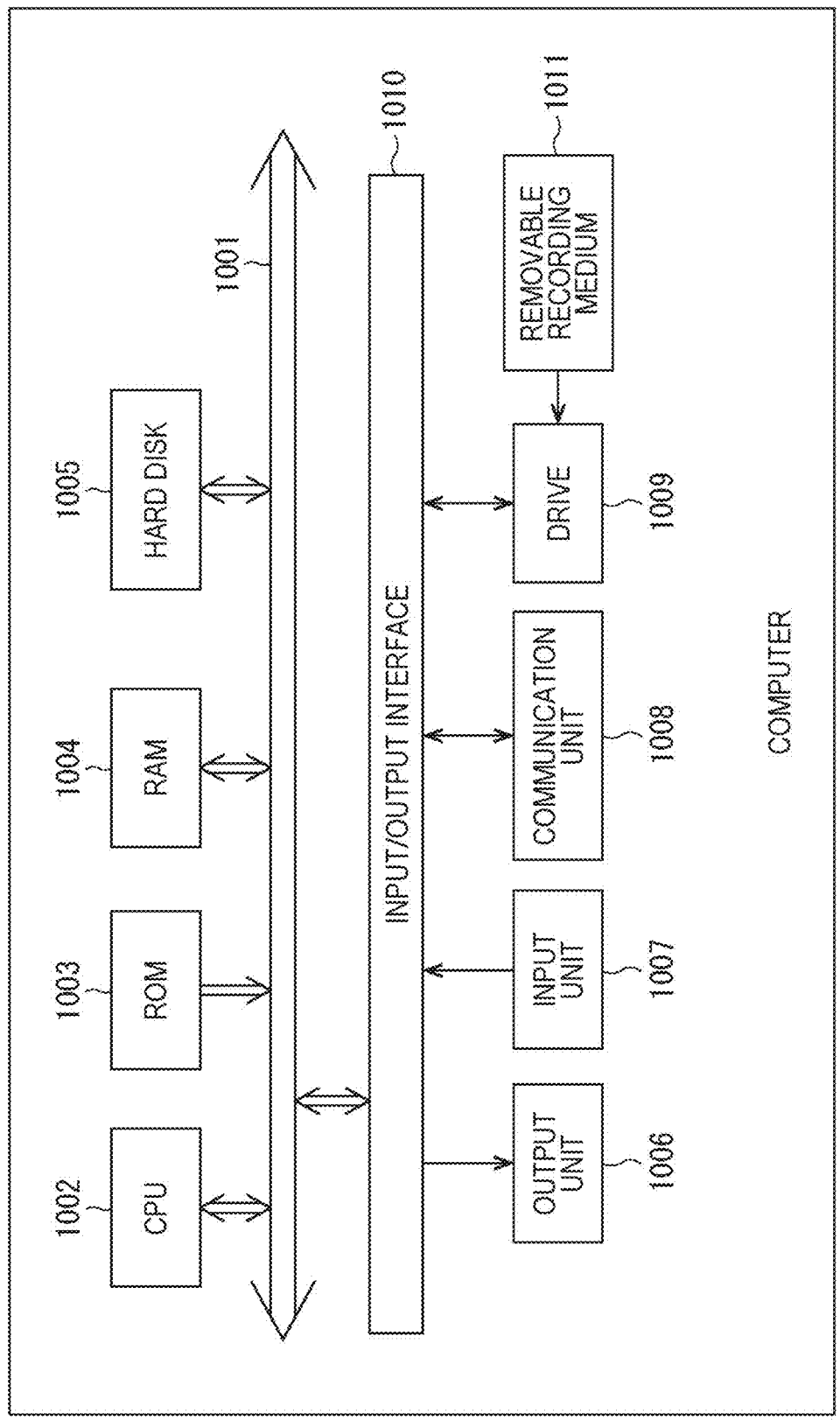
FIG. 12 is a block diagram illustrating a configuration example of an embodiment of a computer to which the present technology is applied.

FIG. 12 is a block diagram illustrating a configuration example of an embodiment of a computer in which a program for executing the series of processing described above is installed.

The program can be recorded in advance on a hard disk 1005 or a ROM 1003 as a recording medium incorporated in the computer.

Alternatively, the program can be stored (recorded) in a removable recording medium 1011 driven by a drive 1009. Such a removable recording medium 1011 can be provided as so-called packaged software. Here, examples of the removable recording medium 1011 include a flexible disk, a Compact Disc Read Only Memory (CD-ROM), a Magneto Optical (MO) disk, a Digital Versatile Disc (DVD), a magnetic disk, a semiconductor memory, and the like.

Note that, the program can be installed on the computer from the removable recording medium 1011 as described above, or can be downloaded to the computer via a communications network or a broadcast network and installed on the hard disk 1005 incorporated. In other words, for example, the program can be wirelessly transferred from a download site to the computer via an artificial satellite for digital satellite broadcasting, or can be transmitted to the computer via a network such as a Local Area Network (LAN) or the Internet by wire.

The computer incorporates a Central Processing Unit (CPU) 1002, and an input/output interface 1010 is connected to the CPU 1002 via a bus 1001.

The CPU 1002 executes the program stored in the Read Only Memory (ROM) 1003 according to a command when the command is input by a user operating an input unit 1007 or the like via the input/output interface 1010. Alternatively, the CPU 1002 loads the program stored in the hard disk 1005 into a random access memory (RAM) 1004 and executes the program.

The CPU 1002 therefore performs the processing according to the above-described flowchart or the processing performed by the configuration of the above-described block diagram. Then, the CPU 1002 causes the processing result to be output from an output unit 1006 or transmitted from a communication unit 1008 via the input/output interface 1010 as necessary, and further, recorded on the hard disk 1005, for example.

Note that, the input unit 1007 includes a keyboard, a mouse, a microphone, and the like. Furthermore, the output unit 1006 includes a Liquid Crystal Display (LCD), a speaker, and the like.

Here, in the present specification, the processing performed by the computer in accordance with the program does not necessarily have to be performed chronologically in the order described as the flowchart. That is, the processing performed by the computer in accordance with the program also includes processes executed in parallel or individually (for example, parallel processing or processing by an object).

Furthermore, the program may be processed by one computer (processor) or may be distributed and processed by a plurality of computers. Moreover, the program may be transferred to a remote computer and executed.

Moreover, in the present specification, a system means a set of a plurality of constituents (device, module (component), and the like), and it does not matter whether or not all of the constituents are in the same cabinet. Thus, a plurality of devices that is accommodated in a separate cabinet and connected to each other via a network and one device that accommodates a plurality of modules in one cabinet are both systems.

Furthermore, for example, the configuration described as one device (or processing unit) may be divided and configured as a plurality of devices (or processing units). Conversely, configurations described as a plurality of devices (or processing units) in the above may be collectively configured as one device (or processing unit). Furthermore, configurations other than those described above may be added to the configuration of each device (or each processing unit), of course. Moreover, as long as the configuration and operation of the system as a whole are substantially the same, a part of the configuration of a certain device (or processing unit) may be included in the configuration of another device (or another processing unit).

Furthermore, for example, the present technology can adopt a configuration of cloud computing that shares one function in a plurality of devices via a network to process in cooperation.

Furthermore, for example, the program described above can be executed in an arbitrary device. In that case, it is sufficient that the device has a necessary function (functional block, or the like) and can obtain necessary information.

Furthermore, for example, each step described in the above flowchart can be executed by sharing in a plurality of devices, other than being executed by one device. Moreover, in a case where a plurality of pieces of processing is included in one step, the plurality of pieces of processing included in the one step can be executed by sharing in a plurality of devices, other than being executed by one device. In other words, a plurality of pieces of processing included in one step can be executed as processing of a plurality of steps. Conversely, processing described as a plurality of steps can be executed collectively as one step.

Note that, in the program executed by the computer, pieces of processing of steps describing the program may be executed in chronological order along with the order described in the present specification, or in parallel, or may be individually executed at necessary timing such as when each step is called. That is, as long as inconsistency does not occur, the processing of each step may be executed in an order different from the order described above. Moreover, the processing of the step describing the program may be executed in parallel with processing of another program, or may be executed in combination with the processing of the other program.

Note that, as long as inconsistency does not occur, each of a plurality of the present technologies described in the present specification can be implemented alone independently. Of course, it is also possible to implement by combining any of the plurality of present technologies. For example, a part or all of the present technology described in any of the embodiments can be implemented in combination with a part or all of the present technology described in other embodiments. Furthermore, a part or all of the present technology described above can be implemented in combination with another technology not described above.

<Combination Example of Configurations>

Note that, the present technology can also be configured as described below.

(1)

An image processing device including:
- an adaptive color conversion unit that performs adaptive color conversion processing of adaptively performing conversion of a color space of an image to be encoded, on a residual signal of the image;
- an orthogonal transform unit that performs orthogonal transform processing for each of orthogonal transform blocks that are units of processing, on a residual signal of the image or on a residual signal of the image subjected to the adaptive color conversion processing; and
- a controller that performs control related to application of the adaptive color conversion processing.

(2)

The image processing device according to (1), in which
a first block size and a second block size larger than the first block size are defined as a maximum block size of the orthogonal transform blocks, and
the controller performs control to cause the adaptive color conversion unit to apply the adaptive color conversion processing in a case where the first block size is used as the maximum block size of the orthogonal transform blocks.

(3)

The image processing device according to (2), in which
the first block size is 32 and the second block size is 64, and
the controller causes the adaptive color conversion processing to be applied only in a case where 32 is used as the maximum block size of the orthogonal transform blocks.

(4)

The image processing device according to (3), in which
the controller transmits, to a decoding side, sps_act_enabled_flag indicating that the adaptive color conversion processing is applied in a case where sps_max_luma_transform_size_64_flag included in a parameter set of high level syntax is 0.

(5)

The image processing device according to any of (1) to (4), in which
the controller performs control to cause the adaptive color conversion unit to apply the adaptive color conversion processing in a case where a predetermined limitation is provided for an encoding block when the image is encoded.

(6)

The image processing device according to (5), in which
the controller causes the adaptive color conversion processing to be applied in a case where a block size of an encoding block that is a unit of processing when the image is encoded is limited to less than or equal to a predetermined size.

(7)

The image processing device according to (6), in which
the controller causes the adaptive color conversion processing to be applied in a case where a block size of the encoding block is limited to less than or equal to 16×16.

(8)

The image processing device according to any of (1) to (7), in which
in a case where a block size of an encoding block that is a unit of processing when the image is encoded is larger than a predetermined size, the controller performs control to cause the orthogonal transform unit to perform the orthogonal transform processing using the orthogonal transform blocks having small block sizes obtained by dividing the encoding block, and performs control to cause the adaptive color conversion unit to apply the adaptive color conversion processing.

(9)

The image processing device according to (8), in which
in a case where a block size of the encoding block is 64×64, the controller sets the orthogonal transform blocks to 32×32 to cause the orthogonal transform processing to be performed, and causes the adaptive color conversion processing to be applied.

(10)

The image processing device according to any of (1) to (9), further including:
- an inverse orthogonal transform unit that acquires the residual signal by performing inverse orthogonal transform processing for each of the orthogonal transform blocks, on a transform coefficient obtained when the orthogonal transform processing is performed; and
- an inverse adaptive color conversion unit that performs inverse adaptive color conversion processing of adaptively performing inverse conversion of a color space of an image, on the residual signal acquired by the inverse orthogonal transform unit, in which
the controller performs control related to application of the inverse adaptive color conversion processing in correspondence with the adaptive color conversion processing.

(11)

An image processing method including: performing adaptive color conversion processing of adaptively performing conversion of a color space of an image to be encoded on a residual signal of the image;
performing orthogonal transform processing for each of orthogonal transform blocks that are units of processing, on a residual signal of the image or on a residual signal of the image subjected to the adaptive color conversion processing; and
performing control related to application of the adaptive color conversion processing.

(12)

An image processing device including:
- an inverse orthogonal transform unit that acquires a residual signal of an image to be decoded, by performing inverse orthogonal transform processing for each of orthogonal transform blocks that are units of processing, on a transform coefficient obtained when orthogonal transform processing is performed on the residual signal on an encoding side;

an inverse adaptive color conversion unit that performs, on the residual signal, inverse adaptive color conversion processing of adaptively performing inverse conversion of a color space of an image; and a controller that performs control related to application of the inverse adaptive color conversion processing.

(13)

An image processing method including: acquiring a residual signal of an image to be decoded, by performing inverse orthogonal transform processing for each of orthogonal transform blocks that are units of processing, on a transform coefficient obtained when orthogonal transform processing is performed on the residual signal on an encoding side;

performing, on the residual signal, inverse adaptive color conversion processing of adaptively performing inverse conversion of a color space of an image; and performing control related to application of the inverse adaptive color conversion processing.

Note that, the present embodiment is not limited to the embodiment described above, and various modifications are possible without departing from the scope of the present disclosure. Furthermore, the advantageous effects described in the present specification are merely examples and are not limited to them, and other effects may be included.

REFERENCE SIGNS LIST

11 Image processing system
12 Image encoding device
13 Image decoding device
14 Predictor
22 Encoder
23 Storage unit
24 Controller
31 Predictor
32 Decoder
33 Storage unit
34 Controller
41 Calculation unit
42 Adaptive color conversion unit
43 Orthogonal transform unit
44 Quantization unit
45 Inverse quantization unit
46 Inverse orthogonal transform unit
47 Inverse adaptive color conversion unit
48 Calculation unit
49 Predictor
50 Encoder
61 Decoder
62 Inverse quantization unit
63 Inverse orthogonal transform unit
64 Inverse adaptive color conversion unit
65 Calculation unit
66 Predictor

The invention claimed is:

1. An image processing device comprising:
circuitry configured to:
perform adaptive color conversion processing of adaptively performing conversion of a color space of an image to be encoded, on a residual signal of the image;
perform orthogonal transform processing for each of orthogonal transform blocks that are units of processing, on a residual signal of the image or on a residual signal of the image subjected to the adaptive color conversion processing;
perform control related to application of the adaptive color conversion processing, wherein one of a first block size and a second block size larger than the first block size and is 64 are defined as a maximum block size of the orthogonal transform blocks;
determine whether the first block size or 64 is used as the maximum block size; and
apply the adaptive color conversion processing only on condition the first block size is used as the maximum block size of the orthogonal transform blocks and not apply the adaptive color conversion processing on condition the maximum block size is 64.

2. The image processing device according to claim 1, wherein
the first block size is 32.

3. The image processing device according to claim 1, wherein
the circuitry is configured to transmit, to a decoding side, sps_act_enabled_flag indicating that the adaptive color conversion processing is applied in a case where sps_max_luma_transform_size_64_flag included in a parameter set of high level syntax is 0.

4. The image processing device according to claim 1, wherein
the circuitry is configured to apply the adaptive color conversion processing in a case where a block size of an encoding block when the image is encoded is less than or equal to a predetermined size.

5. The image processing device according to claim 4, wherein
the circuitry is configured to apply the adaptive color conversion processing in a case where a block size of the encoding block is limited to less than or equal to 16×16.

6. The image processing device according to claim 1, wherein
in a case where a block size of an encoding block that is a unit of processing when the image is encoded is larger than a predetermined size, the circuitry is configured to perform the orthogonal transform processing using the orthogonal transform blocks having small block sizes obtained by dividing the encoding block, and to apply the adaptive color conversion processing.

7. The image processing device according to claim 6, wherein
in a case where a block size of the encoding block is 64×64, the circuitry is configured to set the orthogonal transform blocks to 32×32 to cause the orthogonal transform processing to be performed, and apply the adaptive color conversion processing.

8. The image processing device according to claim 1, further comprising:
the circuitry is configured to
acquire the residual signal by performing inverse orthogonal transform processing for each of the orthogonal transform blocks, on a transform coefficient obtained when the orthogonal transform processing is performed;
perform inverse adaptive color conversion processing of adaptively performing inverse conversion of a color space of an image, on the residual signal acquired; and
control related to application of the inverse adaptive color conversion processing in correspondence with the adaptive color conversion processing.

9. An image processing method comprising:
performing adaptive color conversion processing of adaptively performing conversion of a color space of an image to be encoded on a residual signal of the image;
performing orthogonal transform processing for each of orthogonal transform blocks that are units of processing, on a residual signal of the image or on a residual signal of the image subjected to the adaptive color conversion processing;
performing control related to application of the adaptive color conversion processing, wherein one of a first block size and a second block size larger than the first block and is 64 are defined as a maximum block size of the orthogonal transform blocks;
determining whether the first block size or 64 is used as the maximum block size of the orthogonal transform blocks;
in response to the first block size is used as the maximum block size of the orthogonal transform blocks, applying the adaptive color conversion processing; and
in response to 64 being used as the maximum block size of the orthogonal transform blocks, not applying the adaptive color conversion processing.

10. An image processing device comprising:
circuitry configured to
acquire a residual signal of an image to be decoded, by performing inverse orthogonal transform processing for each of orthogonal transform blocks that are units of processing, on a transform coefficient obtained when orthogonal transform processing is performed on the residual signal on an encoding side;
perform, on the residual signal, inverse adaptive color conversion processing of adaptively performing inverse conversion of a color space of an image;
control related to application of the inverse adaptive color conversion processing, wherein one of a first block size and a second block size larger than the first block size and is 64 are defined as a maximum block size of the orthogonal transform blocks;
determine whether the first block size or 64 is used as the maximum block size; and
apply the adaptive color conversion processing only on condition that the first block size is used as the maximum block size of the orthogonal transform blocks and not apply the adaptive color conversion processing on condition that the maximum block size is 64.

11. An image processing method comprising:
acquiring a residual signal of an image to be decoded, by performing inverse orthogonal transform processing for each of orthogonal transform blocks that are units of processing, on a transform coefficient obtained when orthogonal transform processing is performed on the residual signal on an encoding side;
performing, on the residual signal, inverse adaptive color conversion processing of adaptively performing inverse conversion of a color space of an image; and
performing control related to application of the inverse adaptive color conversion processing, wherein one of a first block size and a second block size larger than the first block size and is 64 are defined as a maximum block size of the orthogonal transform blocks;
determining whether the first block size or 64 is used as the maximum block size of the orthogonal transform blocks;
in response to the first block size is used as the maximum block size of the orthogonal transform blocks, applying the adaptive color conversion processing; and
in response to 64 being used as the maximum block size of the orthogonal transform blocks, not applying the adaptive color conversion processing.

12. The image processing device according to claim 10, wherein the first block size is 32.

13. The image processing device according to claim 10, wherein
the circuitry is configured to receive, from an encoding side, sps_act_enabled_flag indicating that the adaptive color conversion processing is applied in a case where sps_max_luma_transform_size_64_flag included in a parameter set of high level syntax is 0.

14. The image processing device according to claim 10, wherein
the circuitry is configured to apply the inverse adaptive color conversion processing in a case where a block size of an encoding block when the image is encoded is less than or equal to a predetermined size.

15. The image processing device according to claim 14, wherein
the circuitry is configured to apply the inverse adaptive color conversion processing in a case where a block size of the encoding block is limited to less than or equal to 16×16.

16. The image processing device according to claim 10, wherein
in a case where a block size of an encoding block that is a unit of processing when the image is encoded is larger than a predetermined size, the circuitry is configured to perform the inverse orthogonal transform processing using the orthogonal transform blocks having small block sizes obtained by dividing the encoding block, and to apply the inverse adaptive color conversion processing.

17. The image processing device according to claim 16, wherein
in a case where a block size of the encoding block is 64×64, the circuitry is configured to set the orthogonal transform blocks to 32×32 to cause the inverse orthogonal transform processing to be performed, and apply the inverse adaptive color conversion processing.

18. The image processing method according to claim 9, wherein the first block size is 32.

19. The image processing method according to claim 9, wherein
transmitting, to a decoding side, sps_act_enabled_flag indicating that the adaptive color conversion processing is applied in a case where sps_max_luma_transform_size_64_flag included in a parameter set of high level syntax is 0.

20. The image processing method according to claim 9, wherein
applying the adaptive color conversion processing in a case where a block size of an encoding block when the image is encoded is less than or equal to a predetermined size.

* * * * *